United States Patent
Ertin et al.

(10) Patent No.: US 12,551,135 B2
(45) Date of Patent: Feb. 17, 2026

(54) MOBILE ULTRAWIDEBAND RADAR MONITORING THORACIC FLUID LEVELS AND CARDIO-RESPIRATORY FUNCTION

(71) Applicant: OHIO STATE INNOVATION FOUNDATION, Columbus, OH (US)

(72) Inventors: Emre Ertin, Columbus, OH (US); William T. Abraham, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 18/846,994

(22) PCT Filed: Mar. 16, 2023

(86) PCT No.: PCT/US2023/064570
§ 371 (c)(1),
(2) Date: Sep. 13, 2024

(87) PCT Pub. No.: WO2023/178267
PCT Pub. Date: Sep. 21, 2023

(65) Prior Publication Data
US 2025/0194949 A1    Jun. 19, 2025

Related U.S. Application Data

(60) Provisional application No. 63/321,422, filed on Mar. 18, 2022.

(51) Int. Cl.
*A61B 5/0205* (2006.01)
*A61B 5/00* (2006.01)
(Continued)

(52) U.S. Cl.
CPC .............. *A61B 5/08* (2013.01); *A61B 5/05* (2013.01); *G01S 7/417* (2013.01);
(Continued)

(58) Field of Classification Search
CPC ....... A61B 5/00; A61B 5/0002; A61B 5/0024; A61B 5/0037; A61B 5/08; A61B 5/05;
(Continued)

(56) References Cited

U.S. PATENT DOCUMENTS

| 11,240,579 B2 | 2/2022 | Jumbe et al. |
| 2017/0258366 A1 | 9/2017 | Tupin et al. |

(Continued)

FOREIGN PATENT DOCUMENTS

WO    WO-2020018707 A1 *    1/2020    ........... G01S 13/522

OTHER PUBLICATIONS

International Search Report and Written Opinion, PCT/US2023/064570, mailed Sep. 14, 2024.
(Continued)

*Primary Examiner* — Boniface N Nganga
(74) *Attorney, Agent, or Firm* — Thomas | Horstemeyer, LLP

(57) ABSTRACT

A mobile bodily imaging system for determination of a lung fluid content is provided, comprising: a stepped-frequency radar generator that generates one or more tone and transmits the one or more tone into a chest of the patient; a sparse deconvolution inversion algorithm to detect reflection points indicating tissue interfaces within the patient and create a sparsity-based image; an initial model generated using Markov Chain Monte Carlo or Deep Neural Network estimates; and a final model generated using a neural renderer, wherein the neural renderer is provided with confirmed data that permits the neural renderer to predict the form of the reflection points, wherein the neural renderer creates an image that is compared to the sparsity based image, and wherein the neural renderer creates refined images in a number of iterations and/or based upon a predetermined (Continued)

threshold of a difference between the refined neural renderer image and the sparsity-based image.

14 Claims, 35 Drawing Sheets

(51) Int. Cl.
    *A61B 5/05*         (2021.01)
    *A61B 5/0507*     (2021.01)
    *A61B 5/0537*     (2021.01)
    *A61B 5/07*         (2006.01)
    *A61B 5/08*         (2006.01)
    *G01S 7/41*         (2006.01)
    *G01S 13/02*       (2006.01)
    *G01S 13/89*       (2006.01)
    *G06T 7/00*         (2017.01)

(52) U.S. Cl.
    CPC .......... *G01S 13/0209* (2013.01); *G01S 13/89* (2013.01); *G06T 7/0012* (2013.01); *G06T 2207/10044* (2013.01); *G06T 2207/20084* (2013.01); *G06T 2207/30061* (2013.01)

(58) Field of Classification Search
    CPC ....... A61B 5/07; A61B 5/0205; A61B 5/0507; A61B 5/0803; A61B 5/0816; A61B 5/316; A61B 2576/02; G01S 13/02; G01S 13/0209; G06T 7/0012; G06T 2207/10044; G06T 2207/20084; G06T 2207/30061
    USPC .................. 702/19, 189; 600/408, 473, 529; 382/128
    See application file for complete search history.

(56) References Cited

U.S. PATENT DOCUMENTS

2020/0113484 A1    4/2020    Schindhelm et al.
2021/0290074 A1    9/2021    Ertin et al.

OTHER PUBLICATIONS

Carcreff, Ewen, et al., "Resolution Enhancement of Ultrasonic Signals by U-Sampled Sparse Deconvolution," IEEE International Conference on Acoustics Speech and Signal Processing, May 2013.

* cited by examiner

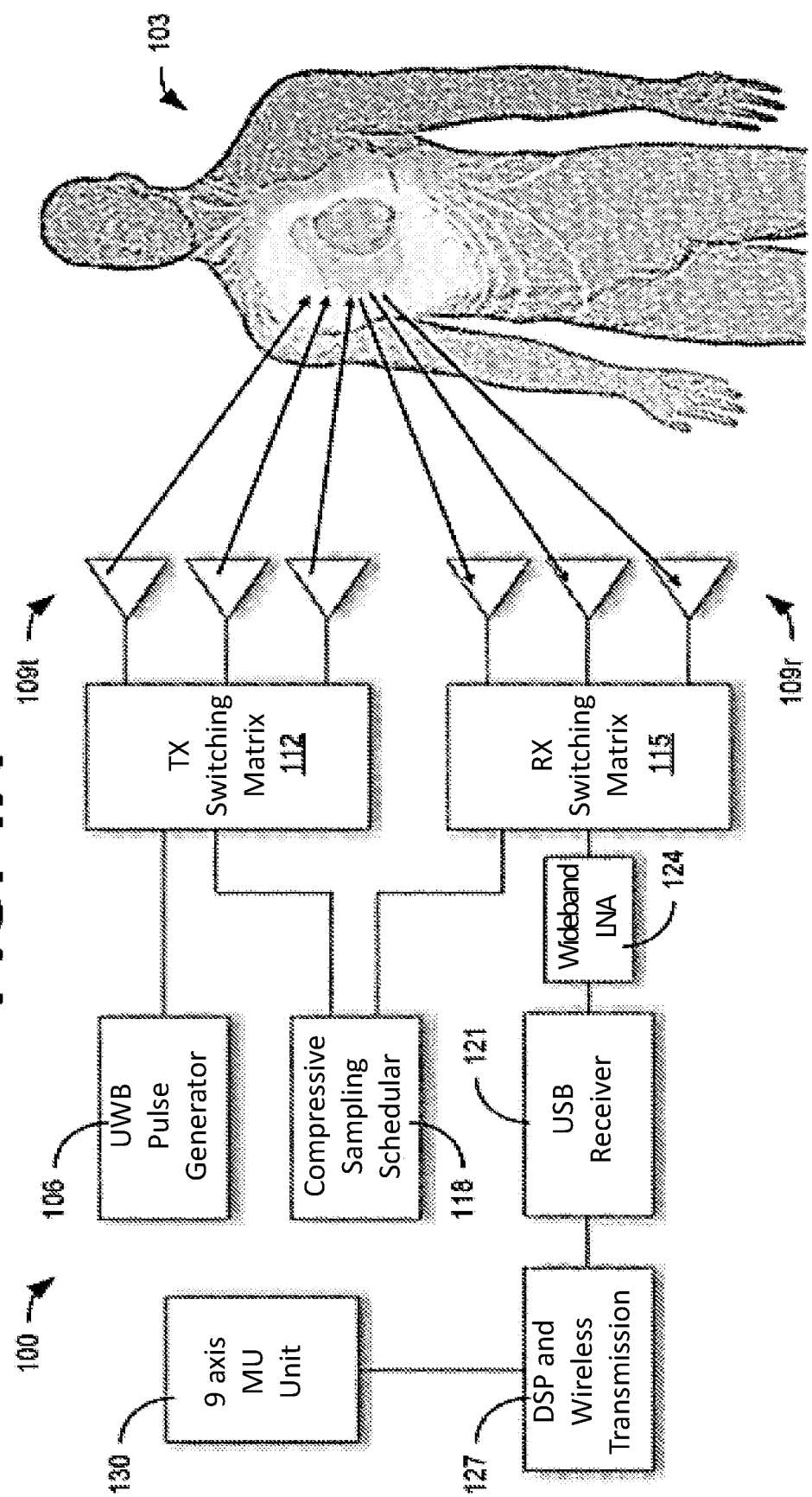

| Tissue | Loss Tangent | Relative Permittivity |
|---|---|---|
| Fat | 0.12 | 5.4 |
| Muscle | 0.32 | 54.8 |
| Lung | 0.38 | 21.8 |
| Body Fluid | 0.43 | 68.8 |
| Bone | 0.31 | 20.6 |

FIG. 3B

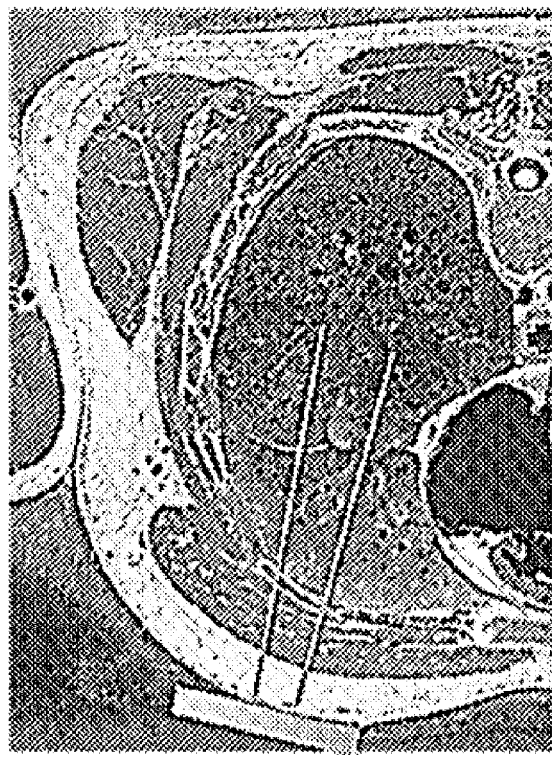
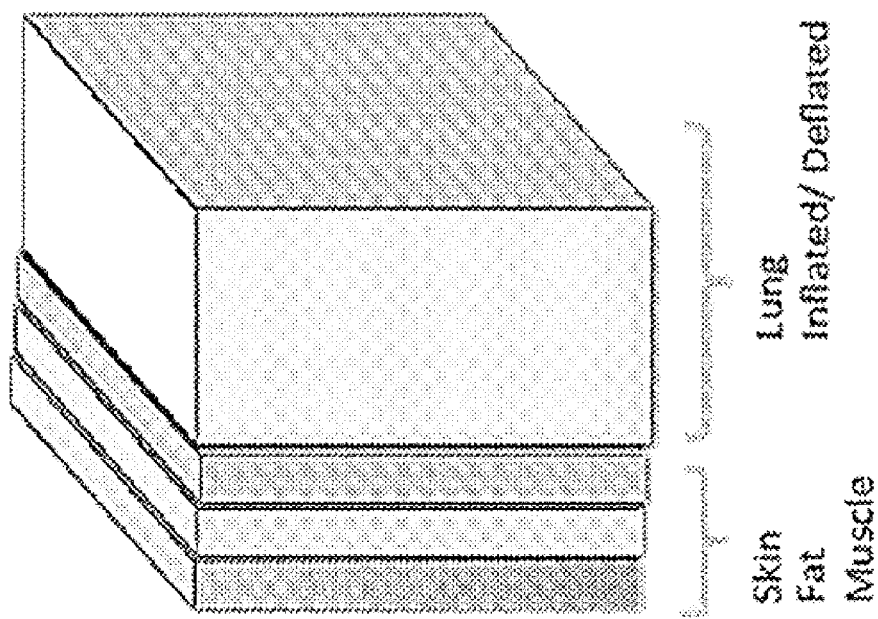
FIG. 5B
FIG. 5A

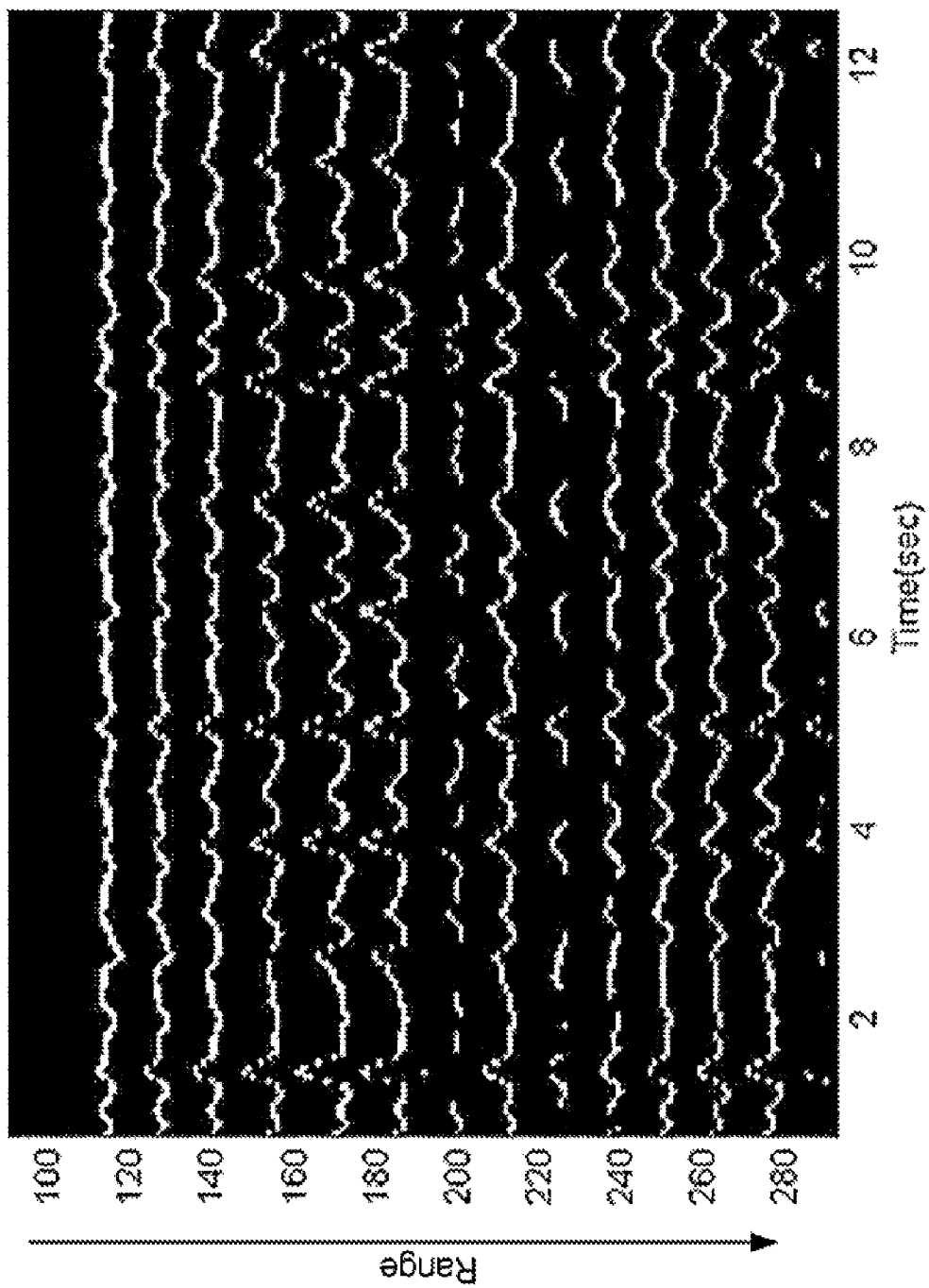

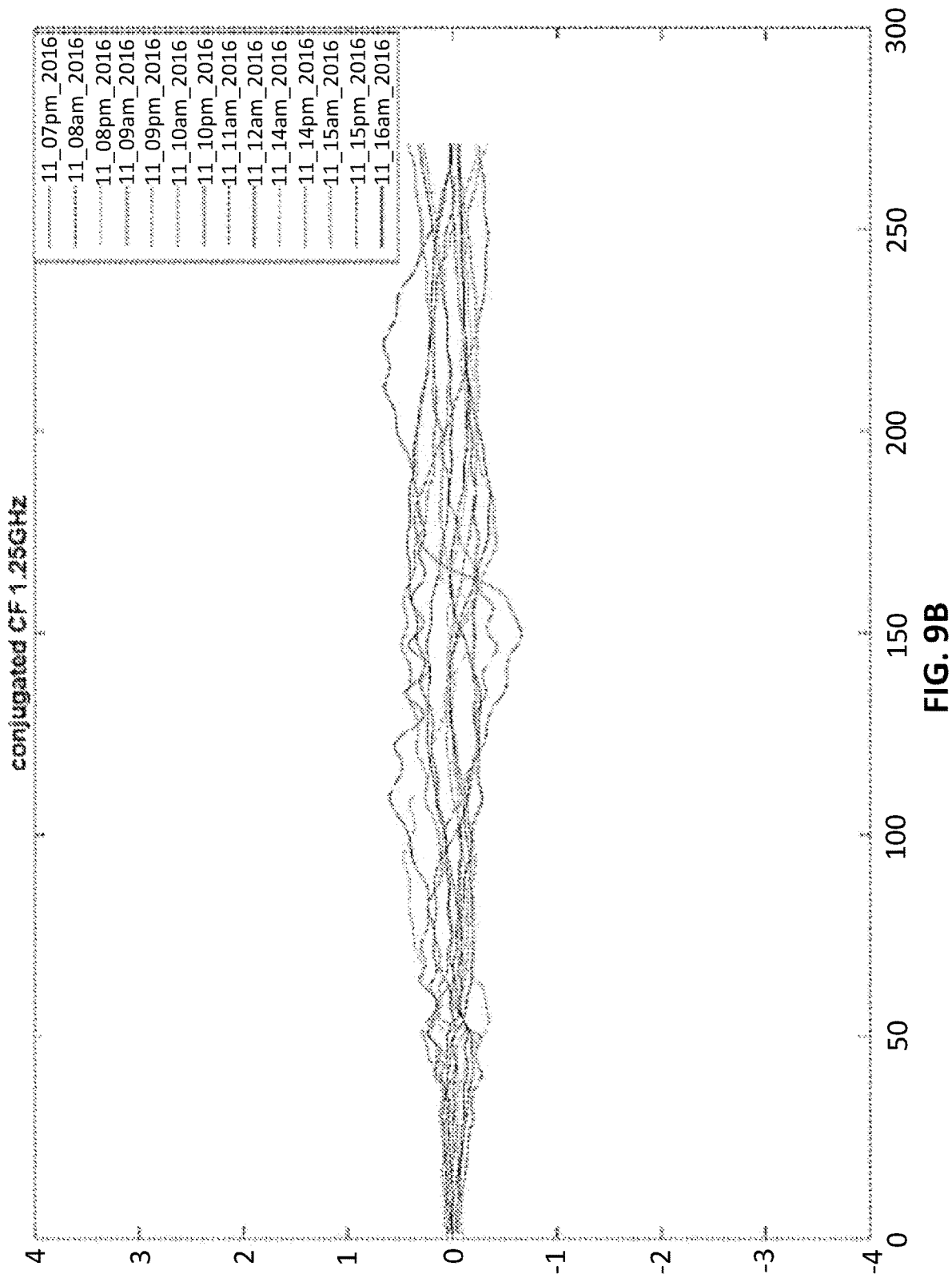

MOBILE ULTRAWIDEBAND RADAR MONITORING THORACIC FLUID LEVELS AND CARDIO-RESPIRATORY FUNCTION

CROSS-REFERENCE TO RELATED APPLICATIONS

This application claims priority from U.S. Provisional Patent Application No. 63/321,422 filed on Mar. 18, 2022, which is incorporated by reference herein in its entirety.

STATEMENT REGARDING FEDERALLY SPONSORED RESEARCH OR DEVELOPMENT

This invention was made with government support under grant/contract number 2037398 awarded by the National Science Foundation. The Government has certain rights in the invention.

BACKGROUND

Congestive Heart Failure ("CHF") affects nearly six million Americans, with 670,000 diagnosed annually. Heart failure is one of the leading causes of hospital admission and readmission and death in the United States ("US") and is also one of the costliest disease syndromes, with direct and indirect costs of care estimated at $34.4 billion US dollars per year. About 80% of this high cost of care is related to managing episodes of heart failure decompensation in the hospital. Efforts need to be targeted toward improving heart failure outcomes and lowering costs of care. Earlier identification and treatment of worsening heart failure in the outpatient setting may prevent the development of heart failure exacerbations that lead to increased morbidity and hospitalizations. The current identifiers of worsening heart failure, namely weight gain and dyspnea, are unreliable and often develop too late in the timeline of disease progression to change outcomes. However, identifying an increased lung fluid content can lead to earlier identification and treatment of heart failure.

Additionally, an increased lung fluid content can indicate other disorders, including without exclusion, renal failure, adult respiratory distress syndrome, COVID-19 infection, and non-cardiogenic causes of pulmonary edema.

Finally, some systems measure a change over a period of time to determine a lung fluid content level. However, it is not desirable to expend any additional amount of time to determine a lung fluid content level, particularly due to the nature of the disorders identified by an increased lung fluid content, and the importance of testing as many patients as possible within a finite amount of time.

What is needed is a real time, reliable, and accurate system for determining a fluid level content of lung tissue to assess the health of a patient's heart.

SUMMARY

In one aspect, a mobile bodily imaging system for determination of a lung fluid content in a lung of a patient is provided, the system comprising: an ultrawideband pulse generator that generates one or more ultrawideband pulse and transmits the ultrawideband pulse into a chest of the patient; an ultrawideband RF sensor positioned on the patient's chest adjacent to the patient's skin to receive reflected backscatter waves from the patient's chest; a sparse deconvolution inversion algorithm used to detect reflection points indicating tissue interfaces within the patient's body and create a sparsity-based image; an initial model generated using one or more of Markov Chain Monte Carlo or Deep Neural Network estimates; and a final model generated using a neural renderer, wherein the neural renderer is previously provided with confirmed data that permits the neural renderer to predict the form of the sparse deconvolution reflection points given previously established model parameters, wherein the neural renderer creates an image that is compared to the sparsity-based image, and wherein the neural renderer creates refined images in one or more of a predetermined number of iterations and based upon a predetermined threshold of a difference between the refined neural renderer image and the sparsity-based image.

In another aspect, a method for determining a lung fluid content in a lung of a patient is provided, the method comprising: providing an ultrawideband pulse generator that generates one or more ultrawideband pulse and transmits the ultrawideband pulse into a chest of the patient; positioning an ultrawideband RF sensor on the patient's chest adjacent to the patient's skin to receive reflected backscatter waves from the patient's chest; using a sparse deconvolution inversion algorithm to detect reflection points indicating tissue interfaces within the patient's body and creating a sparsity-based image; generating an initial model using one or more of Markov Chain Monte Carlo or Deep Neural Network estimates; and generating a final model using a neural renderer, previously providing the neural renderer with confirmed data that permits the neural renderer to predict the form of the sparse deconvolution reflection points given previously established model parameters, creating an image using the neural renderer, wherein the image is compared to the sparsity-based image, and creating refined images using the neural renderer in one or more of a predetermined number of iterations and based upon a predetermined threshold of a difference between the refined neural renderer image and the sparsity-based image.

In another aspect, a mobile bodily imaging system for determination of a lung fluid content in a lung of a patient is provided, the system comprising: a stepped-frequency radar generator that generates one or more tones and transmits the one or more tones into a chest of the patient; an ultrawideband RF sensor positioned on the patient's chest adjacent to the patient's skin to receive reflected backscatter waves from the patient's chest; a sparse deconvolution inversion algorithm used to detect reflection points indicating tissue interfaces within the patient's body and create a sparsity-based image; an initial model generated using one or more of Markov Chain Monte Carlo or Deep Neural Network estimates; and a final model generated using a neural renderer, wherein the neural renderer is previously provided with confirmed data that permits the neural renderer to predict the form of the sparse deconvolution reflection points given previously established model parameters, wherein the neural renderer creates an image that is compared to the sparsity-based image, and wherein the neural renderer creates refined images in one or more of a predetermined number of iterations and based upon a predetermined threshold of a difference between the refined neural renderer image and the sparsity-based image.

In another aspect, a method for determining a lung fluid content in a lung of a patient is provided, the method comprising: providing a stepped-frequency radar generator that generates one or more tone and transmits the one or more tone into a chest of the patient; positioning an ultrawideband RF sensor on the patient's chest adjacent to the patient's skin to receive reflected backscatter waves from the patient's chest; using a sparse deconvolution inversion algorithm to detect reflection points indicating tissue interfaces within the patient's body and creating a sparsity-based image; generating an initial model using one or more of Markov Chain Monte Carlo or Deep Neural Network estimates; and generating a final model using a neural renderer, previously providing the neural renderer with confirmed data that permits the neural renderer to predict the form of the sparse deconvolution reflection points given previously established model parameters, creating an image using the neural renderer, wherein the image is compared to the sparsity-based image, and creating refined images using the neural renderer in one or more of a predetermined number of iterations and based upon a predetermined threshold of a difference between the refined neural renderer image and the sparsity-based image.

BRIEF DESCRIPTION OF THE FIGURES

The accompanying figures, which are incorporated in and constitute a part of the specification, illustrate various example configurations, and are used merely to illustrate various example aspects. In the figures, like elements bear like reference numerals.

FIG. 1A is a schematic diagram illustrating an example of a mobile bodily imaging ("MBI") system, in accordance with various aspects of the present disclosure.

FIG. 3B illustrates data collected during sensing of the tissues using the UWB sensor of FIGS. 2A-2C.

FIG. 5A illustrates an idealized multi-layer model and positioning of the UWB sensor of FIGS. 2A-2C.

FIG. 5B illustrates positioning of the UWB sensor of FIGS. 2A-2C on or near a patient's chest.

FIG. 7B illustrates an example of a recovered sparse reflection profile.

FIG. 9B illustrates examples of phase returns processed from the backscatter data.

DETAILED DESCRIPTION

Disclosed herein are various examples related to systems, apparatuses, and methods for mobile bodily imaging using UWB radar. Similar systems, apparatuses, and methods are described in PCT App. No. PCT/US2019/042267, which claims priority to U.S. App. No. 62/699,076, each of which is incorporated by reference herein in its entirety. Reference will now be made in detail to the description of the aspects as illustrated in the figures.

This subject device is a non-invasive technology developed for easy bodily sensing, which measures thoracic fluid levels, in addition to cardiac and lung motion by transmitting UWB radio frequency pulses, or stepped-frequency radar tones, and analyzing the backscattered waves. The bodily imaging system can employ a single sensor unit placed anteriorly on the chest of a user to make its measurements, without need of a second sensor. The sensor unit may be placed at other locations to determine other tissue characteristics. Unlike similar technologies, the MBI system can be used to assess both quantity of fluid in thoracic tissue as well its spatial distribution, informing on intravascular and extravascular volumes, which are potentially clinically relevant measurements. In addition, the fast (e.g., real time) acquisition speed of the bodily imaging system allows tracking of cardiac and lung motion thus enabling continuous imaging of heart rate, heart rate variability, respiration rate, and tidal volume. This fast acquisition speed is an improvement over systems that measure changes in lung fluid content levels over time. The lung and heart measurements may be correlated to further evaluate the user's condition. These markers of cardiovascular system state used together with thoracic fluid levels can provide a comprehensive suite of measures that can be used to predict heart failure events with high sensitivity, low false alarm rate, and sufficient lead time. Additionally, an increased lung fluid content can indicate other disorders, including without exclusion, renal failure, adult respiratory distress syndrome, COVID-19 infection, and non-cardiogenic causes of pulmonary edema.

Figure 1C:
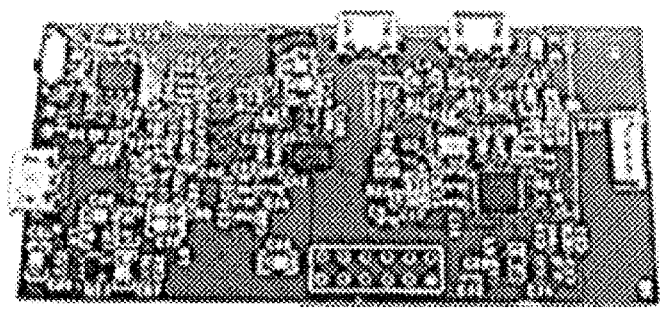
FIG. 1C is an image of portions of the MBI system of FIG. 1A.

FIG. 1A is a schematic diagram illustrating an example of a MBI system 100, which may be controlled through a computing device interface such as, for example, a smartphone interface. The MBI system 100 is an UWB radar system that sends short pulses (e.g., 0.3-0.4 ns duration with an UWB of 0.5-3.5 GHZ), or stepped-frequency radar tones (e.g., 0.5 GHz-3.5 GHz) into the body of a user 103 and records the backscatter from the tissue. In another aspect, ultrawideband sensing may be accomplished by transmitting and receiving series of tones covering the band of frequencies of interest (e.g. 0.5-3.5 GHZ) (stepped-frequency radar). The equivalency of the two approaches may be self-evident, as one set of measurements is the Fourier transform of the other. Radio frequency ("RF") sensing may be ideal for imaging fine-grain internal motion due to its penetration capability into the tissues. Each tissue interface at, for example, the air/skin, skin/fat, fat/muscle, fat/bone, and muscle/lung transitions provides a reflection point that can be tracked in real time through processing of the backscatter echo signals.

Figure 1B:
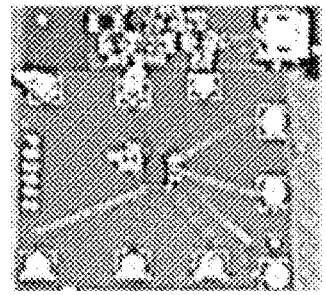
FIG. 1B is an image of portions of the MBI system of FIG. 1A.

The MBI system 100 can use a low power, micro UWB platform to detect the backscatter energy reflected by the tissue and its transitions, measure heart and lung motion, and determine other bodily characteristics, such as thoracic fluid levels, which can be used in the detection of congestion in CHF. As shown in FIG. 1A, the MBI system 100 can include an UWB pulse generator 106 (or stepped-frequency radar) that generates one or more UWB pulse (or stepped-frequency radar tone) transmitted into the tissue of the user 103 by antennas 109t coupled through transmit ("TX") switching matrix 112. For example, the UWB pulse generator 106 (or stepped-frequency radar) can generate the UWB pulses (or stepped-frequency radar tone) with 0.45-3.55 GHz operation. The backscatter from the tissue interfaces is received by antennas 109r coupled to receive ("RX") switching matrix 115. The RX switching matrix 115 directs the received backscatter signal to an UWB receiver 121 through a wideband low noise amplifier ("LNA") 124. A compressive sampling scheduler 118 can coordinate the switching between the different antennas 109 for transmission of the UWB radar pulse (or stepped-frequency radar tone) and reception of the backscatter. Multiple input/multiple output ("MIMO") diversity can be used to focus the signals on the sources of motion or areas of interest. FIG. 1B is an image showing an example of a platform for the TX switching matrix 112 and the RX switching matrix 115 to couple with the antennas 109.

Digital signal processing ("DSP") and wireless transmission circuitry 127 can process the backscatter signals and wirelessly transmit (e.g., via Bluetooth®, WLAN, or other appropriate wireless link) the signal data to a separate computing device such as, but not limited to, a computer, smartphone, tablet, or other mobile processing unit for subsequent processing. The DSP circuitry 127 can compress or otherwise process the backscatter signals for efficient transmission of the data. An inertial measurement unit ("IMU") 130 can also provide orientation and/or movement information to the DSP circuitry 127, which can also be transmitted to the separate processing unit. FIG. 1B is an image showing an example of the UWB platform, with a quarter to illustrate its overall size.

Figure 2A:
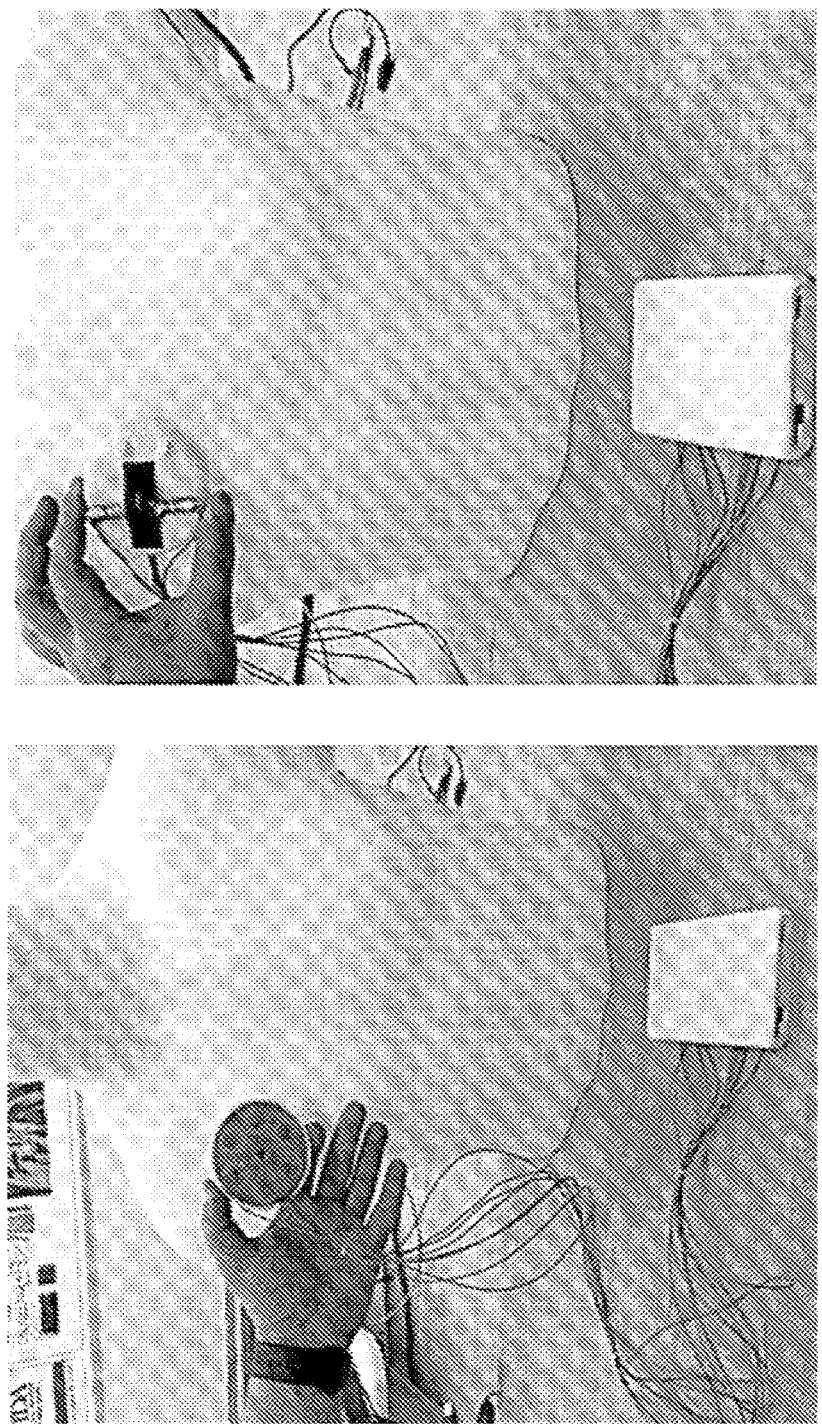
FIG. 2A illustrates an example of ultra-wideband ("UWB") sensors of the bodily imaging system of FIG. 1A.
Figure 2B:
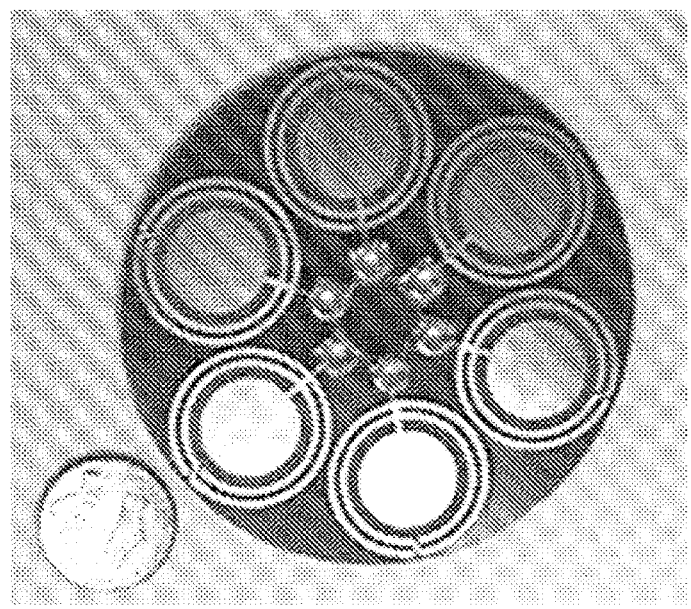
FIG. 2B illustrates an example of UWB sensors of the bodily imaging system of FIG. 1A.
Figure 2C:
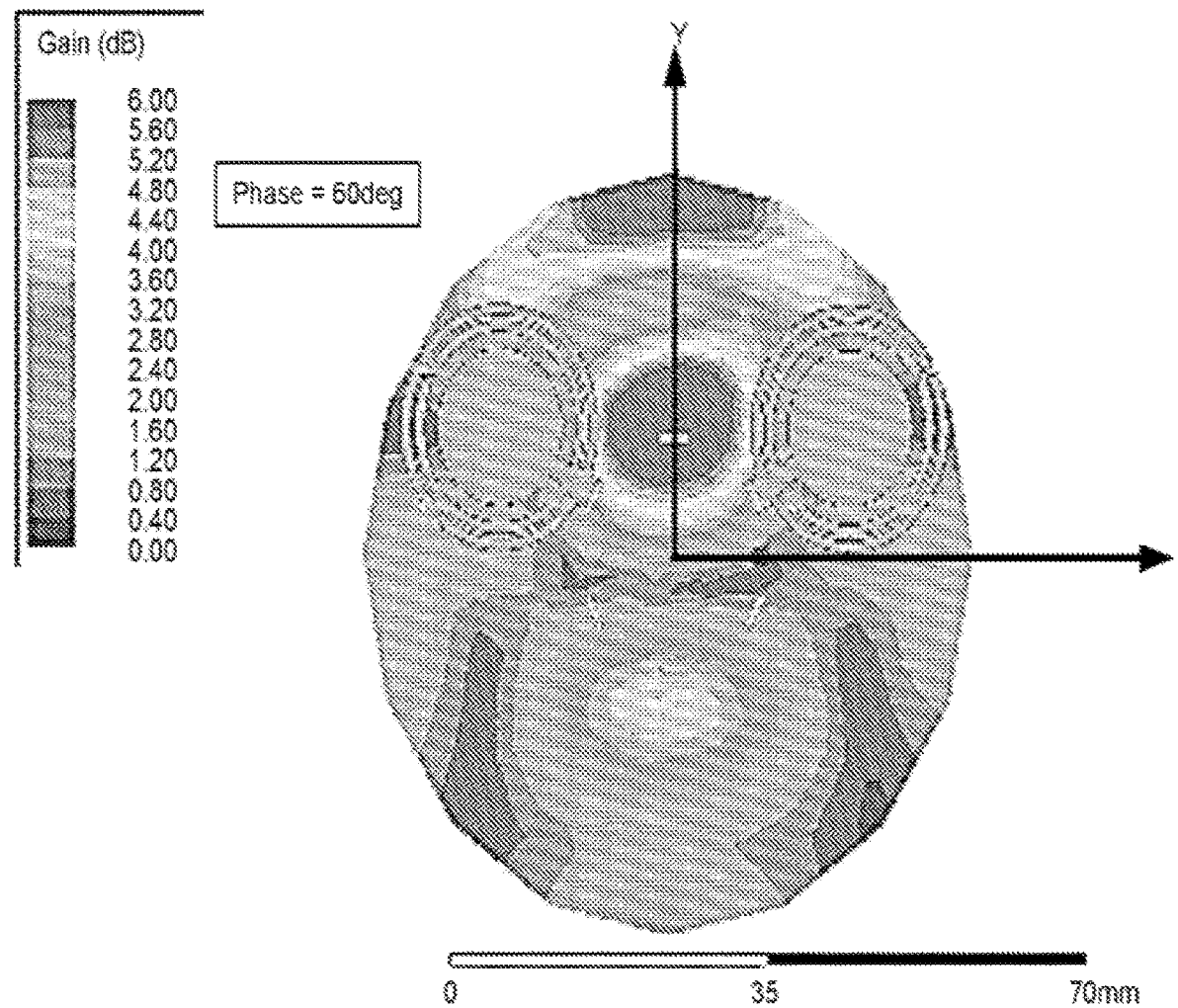
FIG. 2C illustrates an example of gain values for UWB sensors of the bodily imaging system of FIG. 1A.

FIG. 2A shows images of an example of an MBI system 100 including an UWB RF sensor having a circular array of antennas 109. As illustrated in FIG. 2A, the UWB RF sensor can be positioned on the user's chest with the array of antennas adjacent to the skin to direct the transmitted UWB pulse (or stepped-frequency radar tone) into the tissues and receive the reflected backscatter. FIG. 2B is an image of the circular array including six pairs of antennas 109, and FIG. 2C illustrates an example of a radiation pattern of the TX antenna centered launch of electromagnetic ("EM") waves.

Figure 3A:
FIG. 3A illustrates sensing of the tissues using the UWB sensor of FIGS. 2A-2C.
Figure 3A:
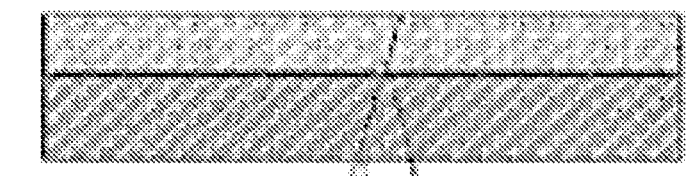
Figure 3A:
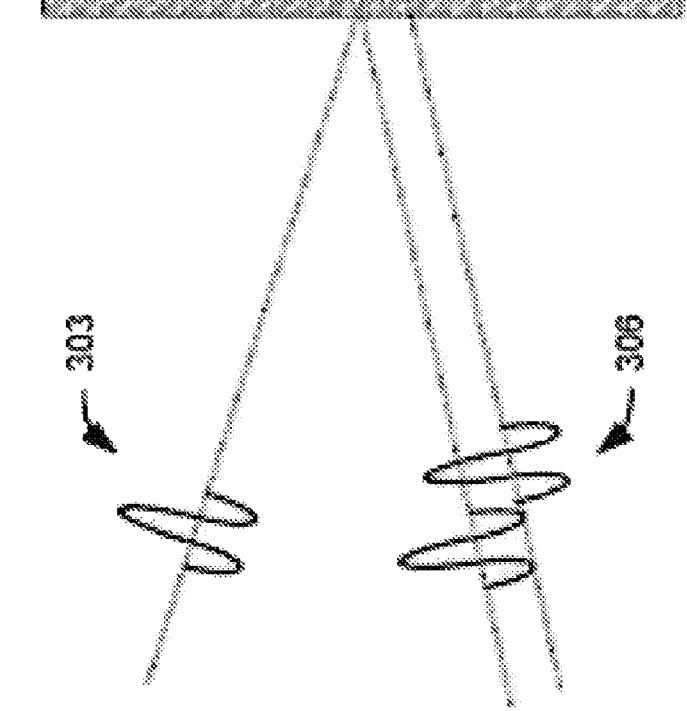
Figure 3A:
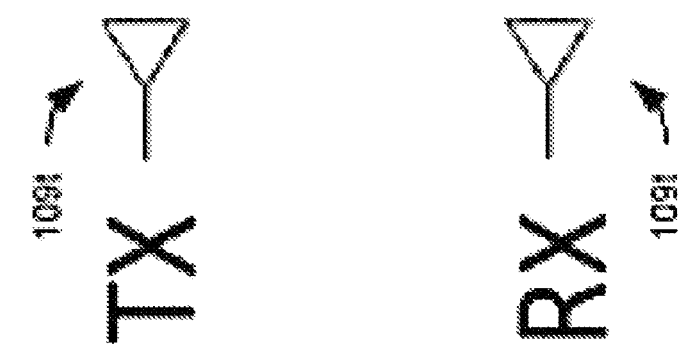

FIG. 3A illustrates the sensing of the tissues using the TX and RX antenna pairs 109. An UWB radar pulse 303 (or stepped-frequency radar tone) can be launched into a body from a TX antenna 109t coupled through the TX switching matrix 112 of FIG. 1A. As the UWB pulse 303 (or stepped-frequency radar tone) propagates through the tissues of the body, backscatter 306 from the tissue interfaces is to the RX antenna 109r. As can be seen in the cross-sectional image of FIG. 1A, the human body is made of various tissues of differing dielectric properties which affect the UWB pulse 303 (or stepped-frequency radar tone) and backscatter 306 as they propagate through the body. For example, the relative permittivity influences the propagation delay through the tissue and the loss tangent affects the absorption of RF energy by the tissue. As can be seen, there exist multiple tissue interfaces for different layers of, for example, skin, fat, muscle, bone, lung, and the like. The table of FIG. 3B provides examples of the loss tangent and relative permittivity of some of the tissues. The backscatter reflected to and received by the RX antenna 109r include these overlapping returns, which can be processed to resolve the location of the various tissue interfaces and associated complex reflection coefficients, revealing the characteristics of the tissues that make up the interface. The high bandwidth and narrow duration (e.g., 0.3-0.4 ns) of the UWB pulses (or stepped-frequency radar tone) allows for higher spatial resolution than, for example, Doppler radar, and enables gating of the returns to the tissue depth of interest.

Figure 4A:
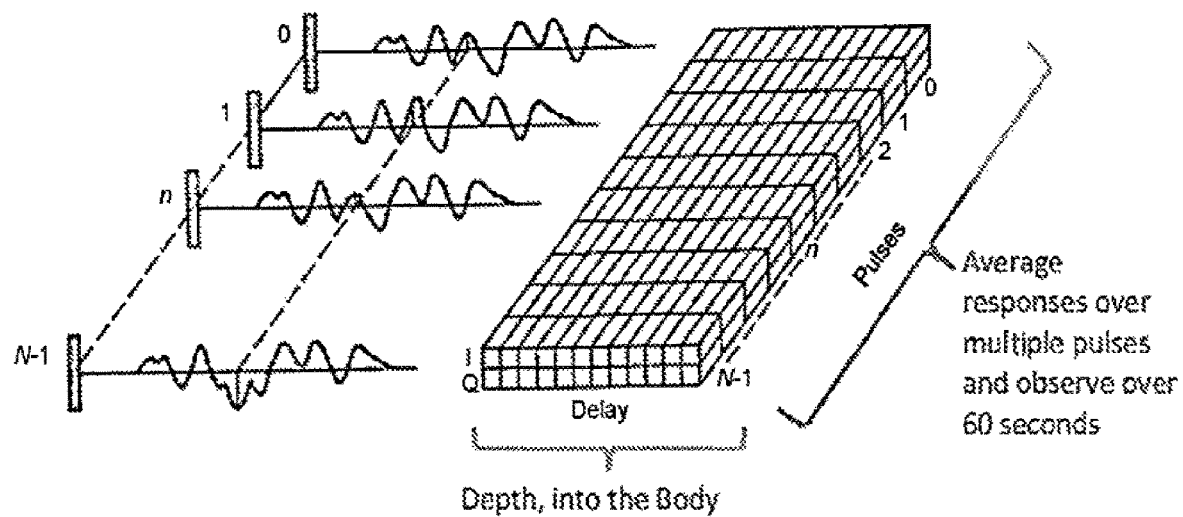
FIG. 4A illustrates backscatter responses of UWB pulses transmitted by the UWB sensor of FIGS. 2A-2C.

During operation of the MBI system 100, thousands of pulses (or in the case of the stepped-frequency radar, thousands of tones) per second (e.g., 10,000 per second) can be sent from the TX antenna 109t. Each pulse (or tone) return contains several echoes delayed in time indicating depth into the body. As illustrated in FIG. 4A (Radar Principles, N. Levanon, 1988), the backscatter responses include returns from different depths (or ranges), which can be averaged over short time periods (e.g., every 0.1 second) or intervals (e.g., every 100 pulses/tones). Considering that a 60 second interval encompasses 15-20 respiration cycles, averaging the responses over such short time periods enhances the return signal to noise ratio without sacrificing the depth information. In this way, the bodily imaging system 100 provides 1D echoes through the tissues several times during the respiration cycle.

Figure 4B:
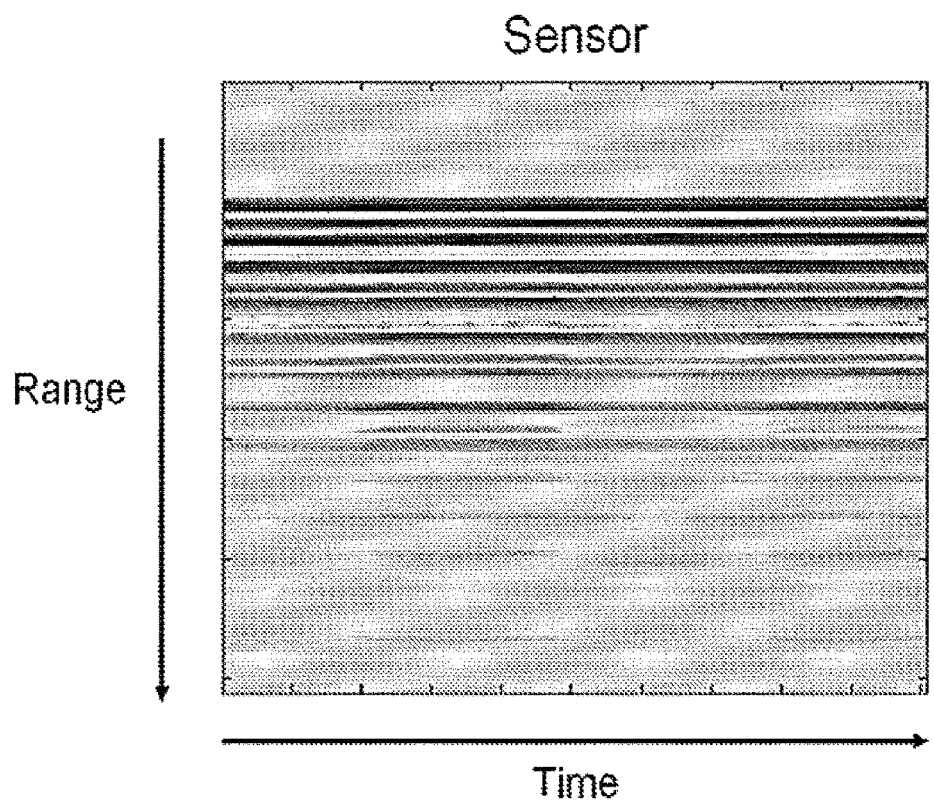
FIG. 4B illustrates backscatter responses of UWB pulses transmitted by the UWB sensor of FIGS. 2A-2C.
Figure 4C:
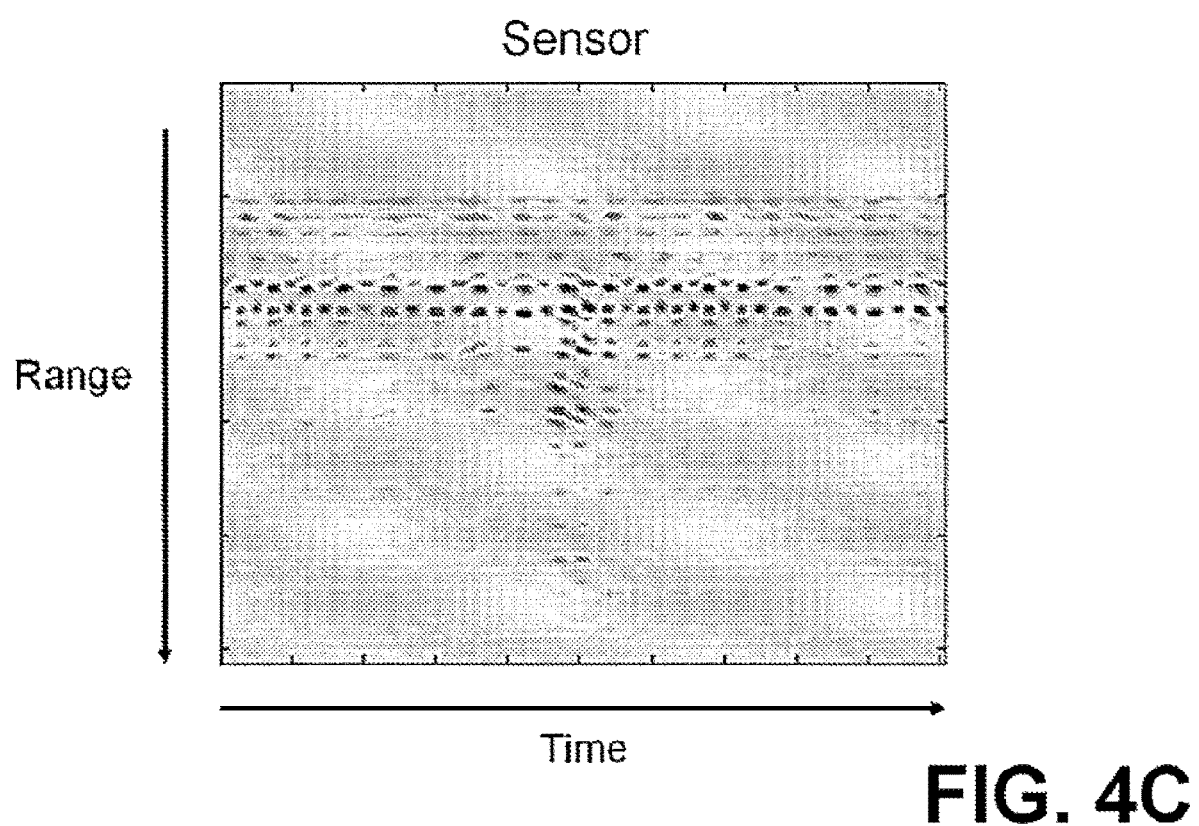
FIG. 4C illustrates backscatter responses of UWB pulses transmitted by the UWB sensor of FIGS. 2A-2C.

In some aspects, the bodily imaging system 100 can process the backscatter signals to produce range profiles at a 100 Hz rate. As illustrated in FIG. 4B, each range profile can indicate the position of the reflection boundaries when convolved with the transmitted pulse (or tone) shape. Filtering the signal over pulses (or tones) for frequencies consistent with heart motion (e.g., 0.5-2 Hz) and/or lung motion (e.g., 0.1-0.3 Hz) reveals structure as shown in FIG. 4C.

The properties of the skin, fat, muscle, lung, and other tissue are modeled and estimated to estimate the permittivity of the lung tissue that can be used to determine lung water or fluid content. Considering an idealized multi-layer model for the tissues through which the EM waves propagate (e.g., skin, fat, and muscle), such as the one illustrated in FIG. 5A, the lung parameters (e.g., thickness and composition) can be estimated. FIG. 5B shows an example of the positioning of the UWB RF sensor on the chest of the user and illustrates the propagation path of the UWB pulses (or stepped-frequency radar tones) into the body. The reflection/transmission coefficient for the lung tissue can be estimated using the wideband measurements from the reflected radar pulses (or tones) (0.5-3.5 GHZ) and the estimated multi-layer EM propagation model for the tissues between the UWB RF sensor and the lung. Since the lung tissue dielectric properties change during the respiration cycle, the lung tissue dielectric properties are estimated at the three points in the respiration cycle (at the bottom of exhalation, at the top of inhalation and at the middle (or average) of the respiration cycle) for overall evaluation of the lung tissue.

The mathematical model for the interface (e.g., skin, fat, muscle, or bone) is non-parametric and can be learned from the sensor data itself with no prior information on the thickness and order of the tissues. Assuming that there are K layers between the UWB RF sensor and the lung tissue (e.g., K=3 or K=4), the thickness and permittivity of each layer can be estimated, assuming an average value for the loss tangent. Since these parameters can be frequency dependent, the sensor measurements can be divided into M frequency bands with a width of, for example, 500 MHz over which the tissue properties can be assumed to be constant. The returns from multiple TX and RX antenna pairs can then be combined for each band and corrected for drifts in the trigger delay using the measurement from the calibration channel (or loop). The calibration measurement can be used to account for distortion and delay produced by the hardware but does not account for the transmission interface between the antenna pairs and the body. This transmission function can be accounted for using a system model.

Figure 6:
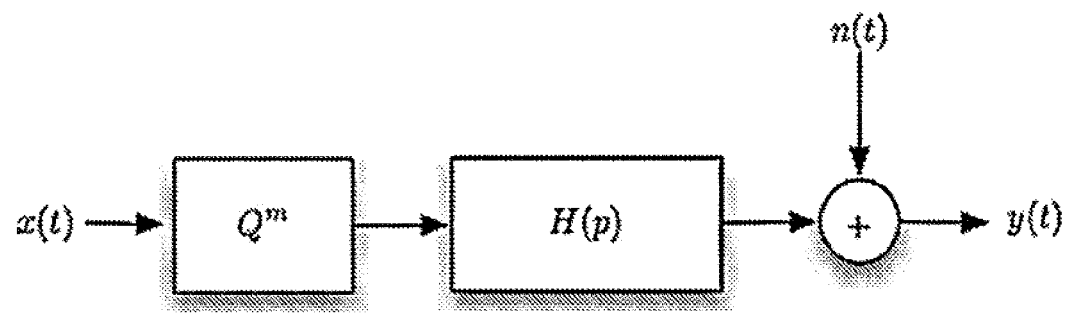
FIG. 6 is a schematic diagram illustrating an example of a system imaging model.

FIG. 6 is a schematic diagram illustrating an example of a system model for the RF imaging. The model can be expressed as:

$$y_i^m = G^m H(p_i) Q^m x_i + n_i,$$

where $y_i$ is the radar return (or backscatter) for frame i, $x_i$ is the estimated reflection (or reflectivity) profile for frame i, p(t) is the impulse response of the radar, $Q^m$ is the bistatic projection matrix for the m-th channel, and H(p) is Toeplitz structured matrix representing the convolution with the transmitted pulse $p_i$, $G^m$ (or tone) is the antenna/body transfer function. Similarly, the reference channel response can be represented as:

$$r_i = H(p_i) z_i + n_i$$

First, sparse deconvolution inversion algorithm (or other regularized inversion) can be used to invert the reference channel to get an estimate of the transmitted pulse (or tone), in the presence of temperature and other environmental factors, enforcing constraints on the power and band limited frequency support and using l1-norm to enforce the sparse set of reflections in the reference channel (ideally a single reflection, but in practice a few due to the imperfect connector mismatches):

$$\min_{\{p_i, y_i\}} |z_i|_1 \text{ s.t. } |r_i - H(p_i)z_i|_2 \leq \sigma_{ref}^2 \; |p_i|_2 \leq 1 \; \sum_l p_i(l) e^{(-j\omega l)} = 0$$

outside passband

While sparse deconvolution inversion is used to sharpen the reflection profiles, other regularized inversion methods may also be used to achieve this result. For example, regularized inversion methods such as Tikhonov regularization, TV (total variation) norm regularization, Lp norm regularization, and Machine Learning-based inversion methods such as generative adversarial networks or Deep Neural Networks can be used to sharpen the range profiles. Next, the estimated pulse $\bar{p}_i$ (or tone) from the reference channel can be used to estimate a sparse set of reflectors corresponding to the tissue interfaces and the antenna transfer function. The mixed L21-norm imposes group sparsity, encoding the knowledge that over a short time frame the tissue boundary locations are stationary with respect to the range bins, but their complex amplitudes may vary based upon respiration and other internal motion:

$$\min_{\{G, x_i\}} |\{x_1^m, \ldots, x_N^m\}|_{2,1} \text{ s.t. } |y_i^m - G^m H(\hat{p}_i) x_i^m|_2 \leq \sigma_{mes}^2, G^m$$

is unit power and bandlimited It should be noted that due to internal reflections, a K layer model will produce distinct returns larger than K. The tissue/fluid estimation can focus only on the first return from each tissue interface.

The solution to both optimization problems can be achieved by alternating the minimization of multiple convex problems corresponding to the various constraints and result in absolute measurements of the complex reflection coefficients $\{x_1^m, \ldots, x_N^m\}$, implementing a wideband (over 3 GHz bandwidth here) calibration against pulse (or tone) distortions as well as against antenna transfer function variations due to replacement and body detuning the antenna.

Figure 7A:
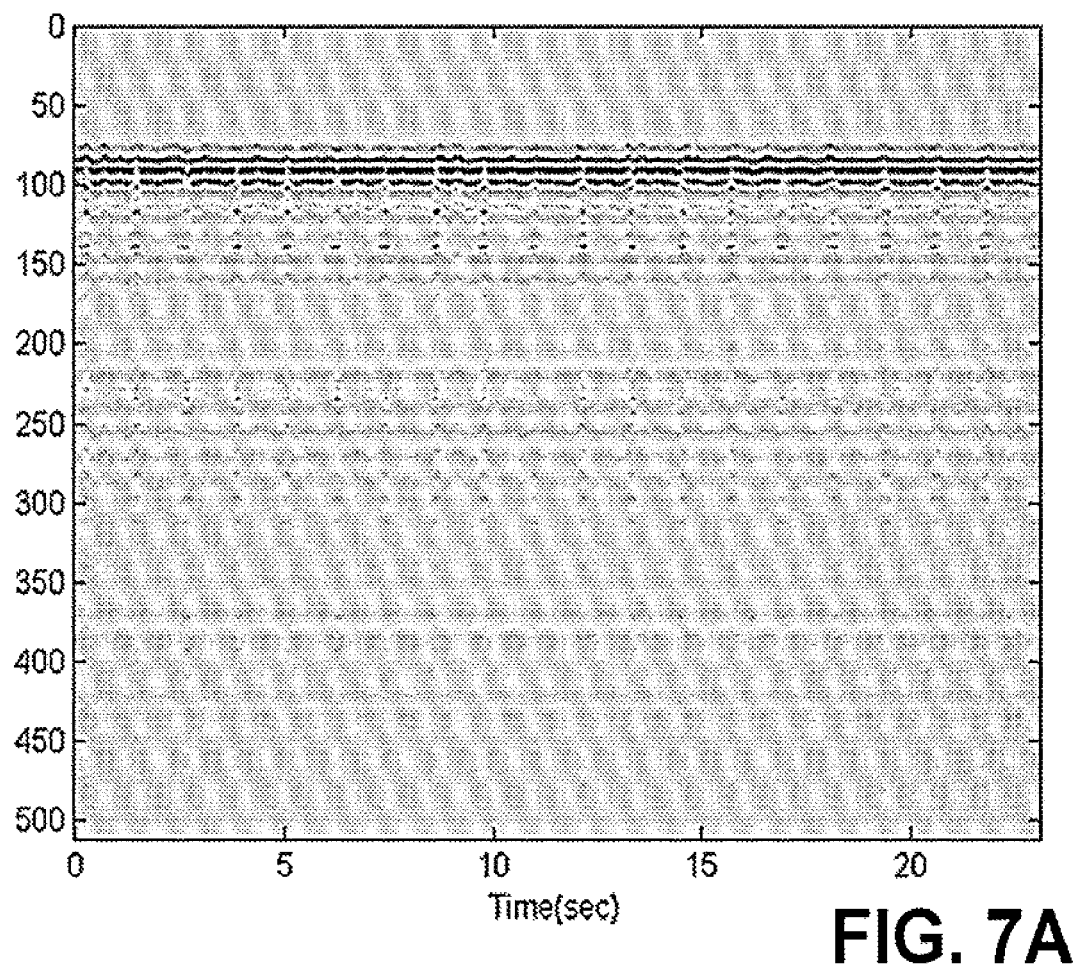
FIG. 7A illustrates an example of measured backscatter data.
Figure 7C:
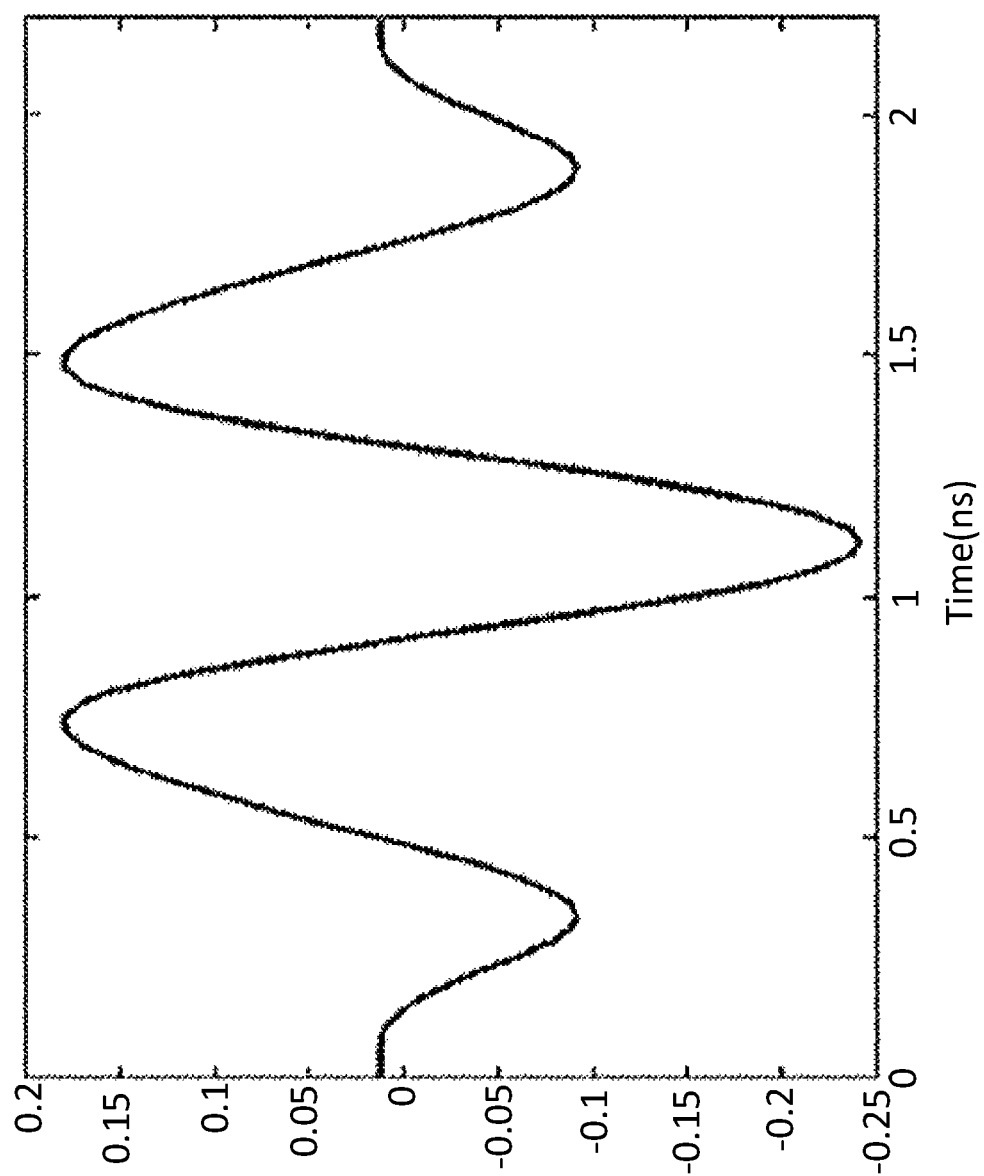
FIG. 7C illustrates an example of a learned pulse shape.

FIG. 7A shows an example of measured backscatter data, and FIGS. 7B and 7C show the recovered sparse reflection profile and learned pulse (or tone) shape, respectively. The determination of the reflection profile can be greatly improved by using the loopback measurements from the calibration circuit to adjust for distortion and delay in the transmitted response.

Figure 8A:
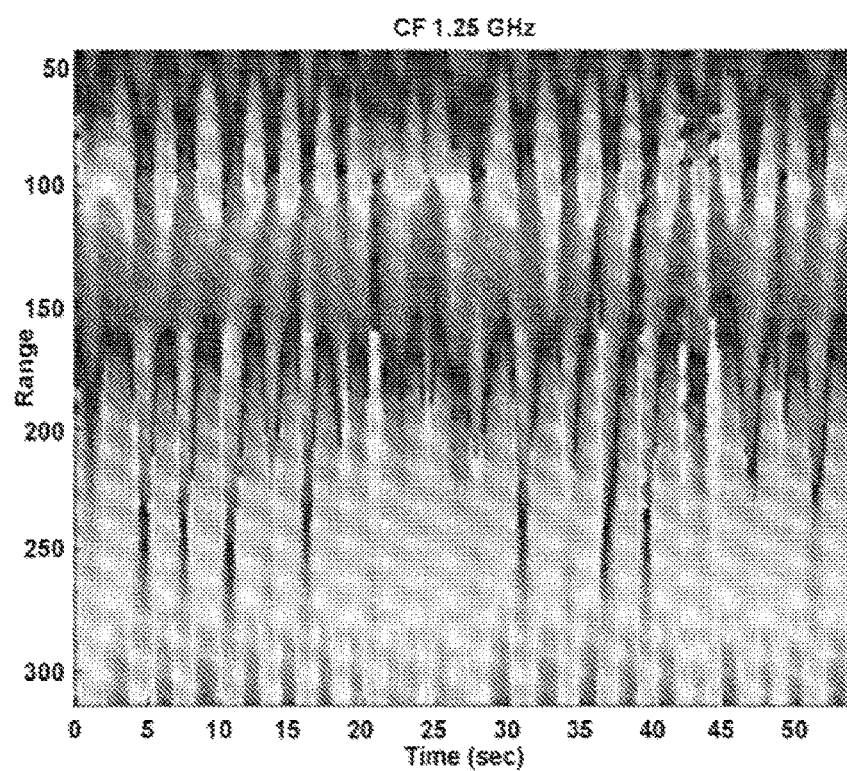
FIG. 8A illustrates examples of frequency bands of backscatter data.
Figure 8B:
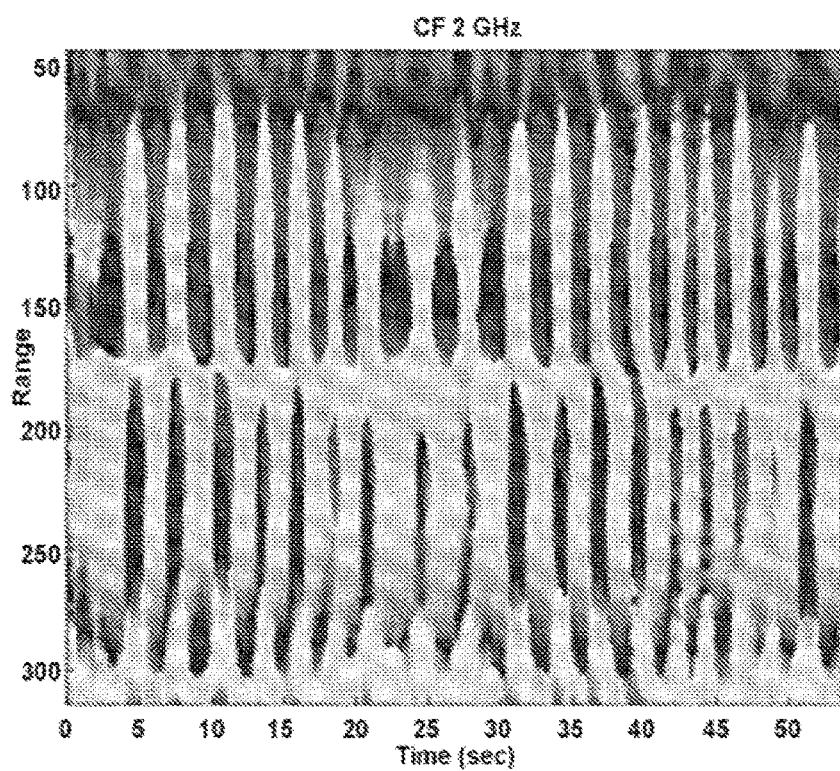
FIG. 8B illustrates examples of frequency bands of backscatter data.

For example, the returns from two frequency bands are given in FIGS. 8A and 8B, with center frequencies of 1.25 GHz and 2 GHz respectively. The depth (or range) into the body is given on the y-axis and the time over respiration cycles is on the x-axis. Different points on the respiration cycle and average returns can be identified for the top, bottom, and middle of the respiration cycle over the respiration periods in one minute.

Figure 9A:
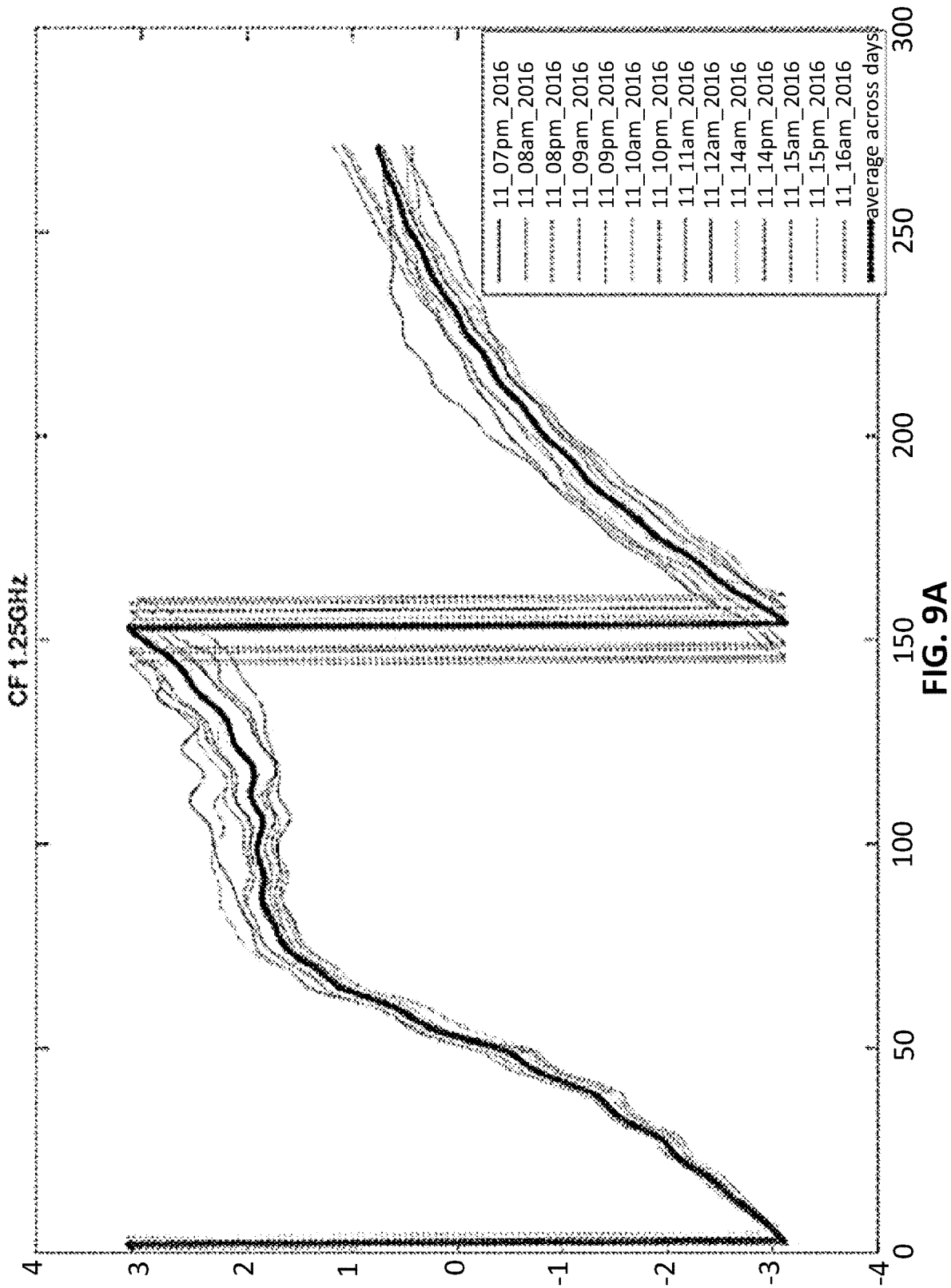
FIG. 9A illustrates examples of phase returns processed from the backscatter data.

The effect of the multi-layer tissue model (including, e.g., skin, fat, muscle, or bone) can be estimated and removed from the measurements, leaving only the reflection and transmission of the lung tissue returns. FIG. 9A shows the phase returns from all tissues, and FIG. 9B illustrates the removing effect of the interface (e.g., skin, fat, muscle, or bone).

Reflection coefficients can be determined from the reflection profile, and the lung response across the depths (or ranges) corresponding to the lung content can be aggregated to provide a measure of lung water or fluid content. Because of the propagation delays through the tissues and the interface locations, the reflection coefficients are complex values including both magnitude and phase information about the backscatter signals. The backscatter-based imaging system is unique in its ability to resolve the tissues based upon the delay and therefore can inform where (in which tissue(s)) the change in fluid volume occurs in addition to the quantity of fluid. This is not possible with alternative systems that use pass-through measurements using transmitter and receivers placed posterior and anteriorly to the body.

Figure 10:
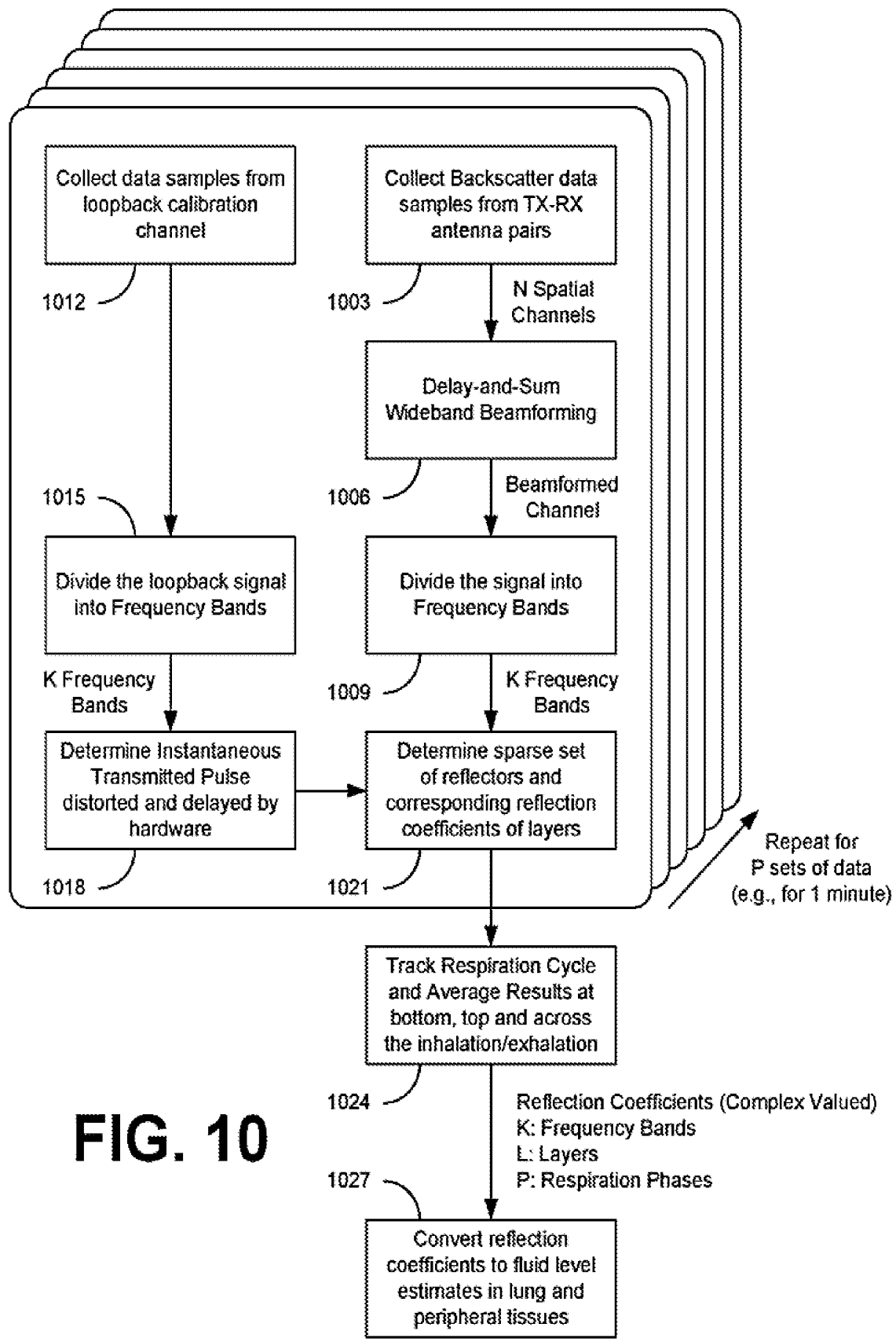
FIG. 10 is a flow chart illustrating an example of the operation of the bodily imaging system of FIG. 1A.

FIG. 10 is a flow chart illustrating an example of the operation of the MBI system 100. As previously discussed, the bodily imaging system 100 comprises a UWB pulse generator 106 (or stepped-frequency radar generator) that generates UWB pulses (or stepped-frequency tones) for transmission into the tissue of the user 103, as shown in FIG. 1A. Beginning at 1003, backscatter data samples are collected using the TX-RX antenna pairs 109 in an UWB sensor positioned on the user's chest. The backscatter is collected for each of the N spatial channels for the TX-RX antenna pairs 109. The comprehensive sampling scheduler 118 can control the TX switching matrix 112 to direct a generated UWB pulse (or tone) to each TX antenna and control the RX switching matrix 115 to receive the reflected backscatter by the corresponding RX antenna in each pair. The captured backscatter data obtained from the different spatial channels by the UWB receiver 121 is delayed and summed by the DSP circuitry 127 (FIG. 1A) at 1006 to generate an averaged wideband beamformed signal, which is then divided into K frequency bands at 1009.

After completing the TX-RX cycle through each of the antenna pairs 109 at 1003, a UWB pulse (or tone) can be directed from the UWB pulse generator 106 (or stepped-frequency radar generator) through the calibration circuit (or loop) at 1012 to obtain loopback measurements that can be used to account for distortion and delay produced by the hardware, and temperature effects. The measured calibration signal is divided into the K frequency bands at 1015. Using the frequency band information of the measured calibration signal, the computing device (or DSP circuitry) can determine the instantaneous UWB pulse (or tone) that is distorted and delayed by the circuit hardware at 1018.

At 1021, the instantaneous UWB pulse (or tone) can be used by the computing device (or DSP circuitry) to bootstrap the determination of a sparse set of reflectors and corresponding reflection coefficients for the tissue layers for the beamformed channel signal. Sparse deconvolution can be used to identify the UWB pulse (or tone) shape and the reflection profiles for the K frequency bands as previously discussed. The reflection profiles for the frequency bands can be combined to determine an averaged reflection profile. Use of the instantaneous UWB pulse (or tone) determined at 1018 compensates for temperature effects on the UWB RF sensor during operation, which improves accuracy and consistency of the determined reflection profiles. The reflection coefficients can be extracted from the reflection profiles.

As shown in FIG. 10, the process (1003 through 1021) is repeated for each set of the N spatial channels for the TX-RX antenna pairs 109 multiple times over a defined period. For example, backscatter data samples (and a corresponding measurement through the calibration circuit) can be collected using the TX-RX antenna pairs 109 for a series of P transmitted pulses (or tones). The data can be collected for a predefined number of data sets or over a predefined period. With the reflection profiles and reflection coefficients determined for the P sets of backscatter data, the computing device can track the lung position and characteristics over the respiration cycle at 1024 based upon determined information. For example, the change in the depth of the lung tissue interface, as well as the lung tissue characteristics, produced by inhalation and exhalation can be determined for over the time period. The results that have been identified as being at the top of the inhalation or at the bottom of the exhalation can be averaged to provide a better measure of the lung tissue characteristics. In addition, results at a middle (or average) point during the breathing cycle can be determined and averaged to provide a common point for evaluation of the lung tissue.

At 1027, the reflection coefficients can be converted into fluid level estimates in the lung tissue. By using the averaged data at the bottom, top, and middle of the respiration cycle, accuracy of the tissue locations and characteristics can be improved. In addition to lung tissue, information about peripheral tissues (e.g., skin, fat, muscle, bone, and heart) can also be determined from the reflection coefficients. In some cases, correlations between the different tissues can be analyzed and evaluated. The information can be converted for display by the computing device in real time (or near real time).

As can be understood, processing of the backscatter data can be carried out by a combination of the DSP circuitry 127 (FIG. 1A) and the computing device. For example, the backscatter data and calibration measurement can be processed by the DSP circuitry to provide the frequency band information (1003 through 1015), which can be transmitted to the computing device for subsequent processing and determination of the tissue information (1018 through 1027). In other implementations, additional processing can be carried out using the DSP circuitry 127 before transmission to the computing device.

Figure 11:
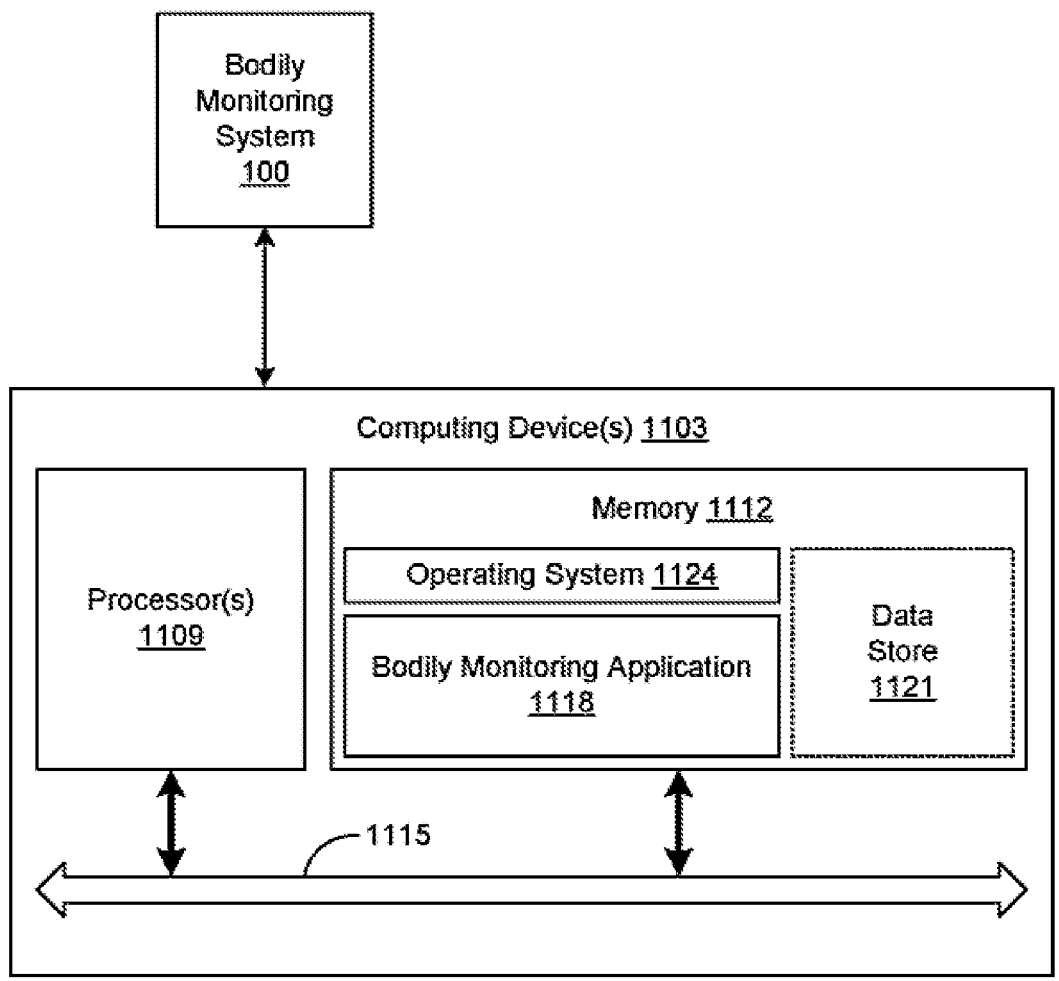
FIG. 11 illustrates an example of a computing device that can be used with the bodily imaging system of FIG. 1A.

FIG. 11 shows an example of a computing device 1103 that can be included in the MBI system 100. The computing device 1103 can be one or more computing device(s) 1103, which include at least one processor circuit, for example, having a processor 1109 and a memory 1112, both of which are coupled to a local interface 1115. To this end, the computing device(s) 1103 may comprise, for example, a computer, laptop, smartphone, tablet, or other mobile processing unit providing computing capability. The computing device(s) 1103 may include, for example, one or more display devices such as cathode ray tubes ("CRT"s), liquid crystal display ("LCD") screens, light emitting diode ("LED") screens, gas plasma-based flat panel displays, LCD projectors, or other types of display devices, and the like. The computing device(s) 1103 may also include, for example various peripheral devices. In particular, the peripheral devices may include input devices such as, for example, a keyboard, keypad, touch pad, touch screen, microphone, scanner, mouse, joystick, or one or more push buttons, and the like. Even though the computing device 1103 is referred to in the singular, a plurality of computing devices 1103 may be employed in the various arrangements as described above. The local interface 1115 may comprise, for example, a data bus with an accompanying address/control bus or other bus structure as can be appreciated.

Stored in the memory 1112 are both data and several components that are executable by the processor 1109. In particular, stored in the memory 1112 and executable by the processor 1109 are a bodily imaging application 1118 and potentially other applications. Also stored in the memory 1112 may be a data store 1121 and other data. The data stored in the data store 1121, for example, is associated with the operation of the various applications and/or functional entities described below. For example, the data store may include data samples, reflective profiles, and other data or information as can be understood. In addition, an operating system 1124 may be stored in the memory 1112 and executable by the processor 1109. The data store 1121 may be located in a single computing device or may be dispersed among many different devices.

The bodily imaging system 100 may be communicatively coupled to the computing device 1103 through a wireless communication link or network. In some aspects, the bodily imaging system 100 may be directly connected to the computing device 1103.

The components executed on the computing device 1103 may include, for example, a bodily imaging application 1118 and other systems, applications, services, processes, engines, or functionality not discussed in detail herein. There may be other applications that are stored in the memory 1112 and are executable by the processor 1109. Where any component discussed herein is implemented in the form of software, any one of several programming languages may be employed such as, for example, C, C++, C#, Objective C, Java, Java Script, Perl, PHP, Visual Basic, Python, Ruby, Delphi, Flash, or other programming languages.

Software components are stored in the memory 1112 and are executable by the processor 1109. In this respect, the term "executable" means a program file that is in a form that can ultimately be run by the processor 1109. Examples of executable programs may be, for example, a compiled program that can be translated into machine code in a format that can be loaded into a random access portion of the memory 1112 and run by the processor 1109, source code that may be expressed in proper format such as object code that is capable of being loaded into a random access portion of the memory 1112 and executed by the processor 1109, or source code that may be interpreted by another executable program to generate instructions in a random access portion of the memory 1112 to be executed by the processor 1109, and the like. An executable program may be stored in any portion or component of the memory 1112 including, for example, random access memory ("RAM"), read-only memory ("ROM"), hard drive, solid-state drive, USB flash drive, memory card, optical disc such as compact disc ("CD") or digital versatile disc ("DVD"), floppy disk, magnetic tape, or other memory components.

The memory 1112 is defined herein as including both volatile and nonvolatile memory and data storage components. Volatile components are those that do not retain data values upon loss of power. Nonvolatile components are those that retain data upon a loss of power. Thus, the memory 1112 may comprise, for example, RAM, ROM, hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory ("SRAM"), dynamic random access memory ("DRAM"), or magnetic random access memory ("MRAM") and other such devices. The ROM may comprise, for example, a programmable read-only memory ("PROM"), an erasable programmable read-only memory ("EPROM"), an electrically erasable programmable read-only memory ("EEPROM"), or other like memory device.

Also, the processor 1109 may represent multiple processors 1109 and the memory 1112 may represent multiple memories 1112 that operate in parallel processing circuits, respectively. In such a case, the local interface 1115 may be an appropriate network that facilitates communication between any two of the multiple processors 1109, between any processor 1109 and any of the memories 1112, or between any two of the memories 1112, and the like. The local interface 1115 may comprise additional systems designed to coordinate this communication, including, for example, performing load balancing. The processor 1109 may be of electrical or of some other available construction.

Although the bodily imaging application 1118, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of technologies. These technologies may include, but are not limited to, discrete logic circuits having logic gates for implementing various logic functions upon an application of one or more data signals, application specific integrated circuits having appropriate logic gates, or other components, and the like. Such technologies are generally well known by those skilled in the art.

The flowchart of FIG. 10 shows functionality and operation of an implementation of portions of a bodily imaging application 1118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1109 in a computer system or other system. The machine code may be converted from the source code, and the like. If embodied in hardware, each block may represent a circuit or a number of interconnected circuits to implement the specified logical function(s).

Although the flowcharts of FIG. 10 show a specific order of execution, the order of execution may differ from that which is depicted. For example, the order of execution of two or more blocks may be rearranged relative to the order shown. Also, two or more blocks shown in succession in FIG. 10 may be executed concurrently or with partial concurrence. Further, in some aspects, one or more of the blocks may be skipped or omitted. In addition, any number of counters, state variables, warning semaphores, or messages might be added to the logical flow described herein, for purposes of enhanced utility, accounting, performance measurement, or providing troubleshooting aids, and the like. All such variations are within the scope of the present disclosure.

Also, any logic or application described herein, including bodily imaging application 1118, that comprises software or code can be embodied in any non-transitory computer-readable medium for use by or in connection with an instruction execution system such as, for example, a processor 1109 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a RAM including, for example, SRAM and DRAM, or MRAM. In addition, the computer-readable medium may be a ROM, a PROM, an EPROM, an EEPROM, or other type of memory device.

Figure 12A:
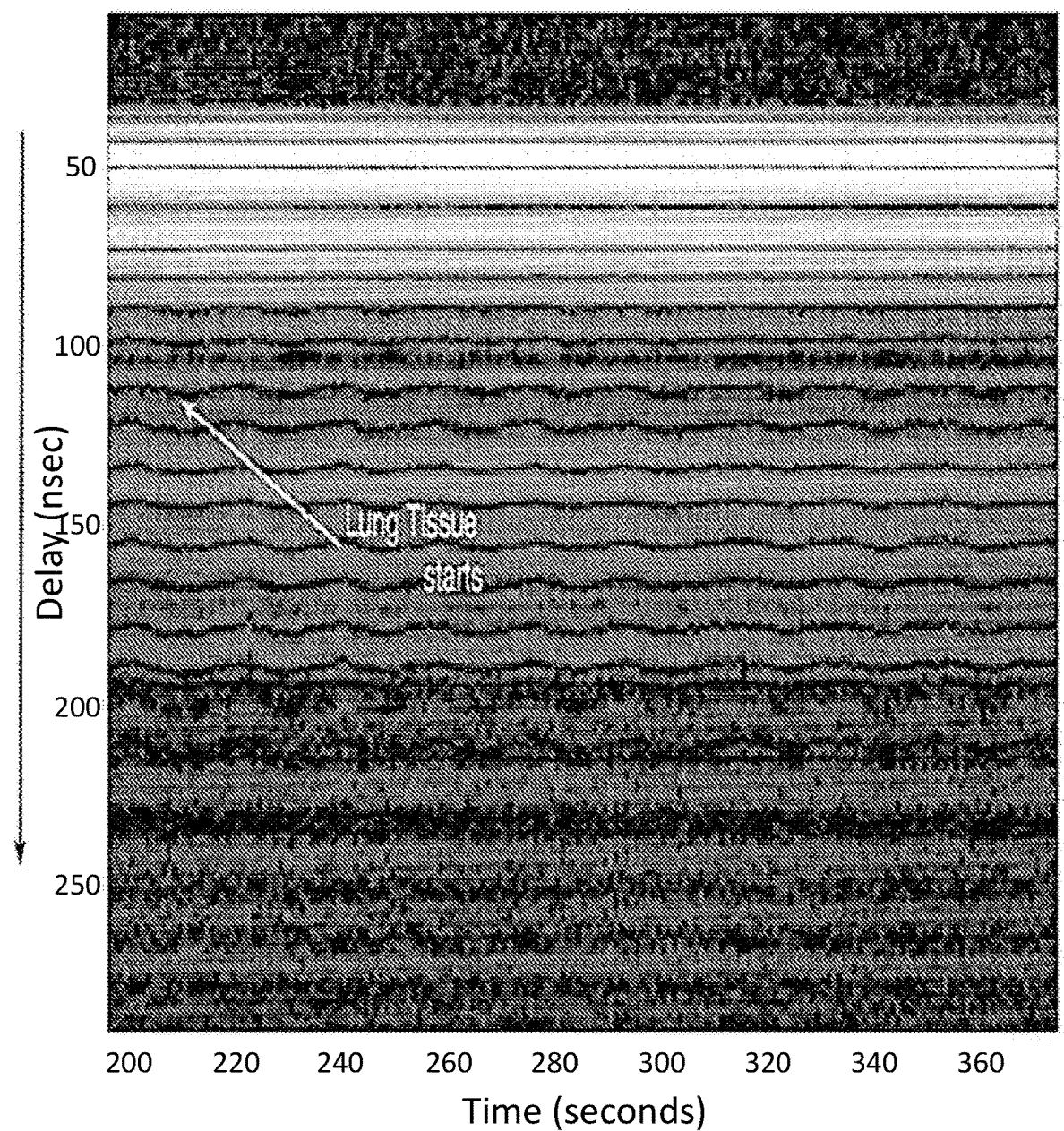
FIG. 12A illustrates an example of backscatter data from pilot study results using the bodily imaging system of FIG. 1A.
Figure 12B:
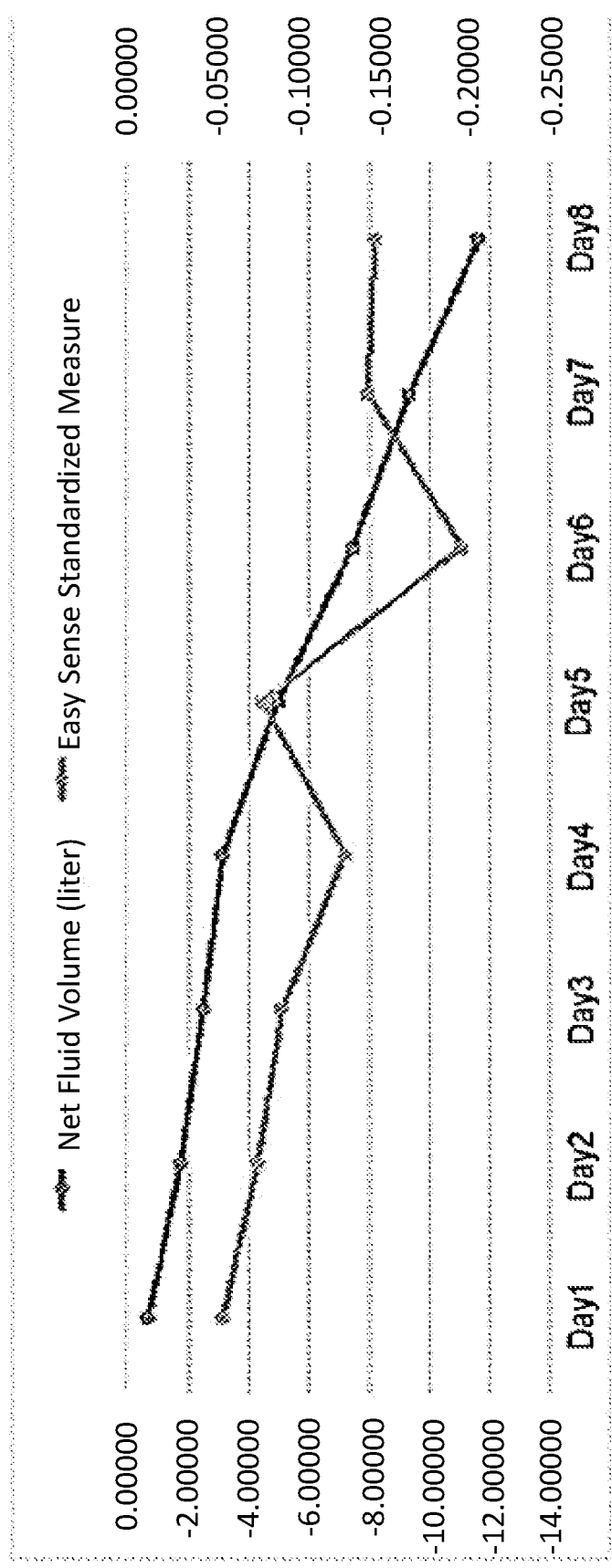
FIG. 12B illustrates data generated in the pilot study using the bodily imaging system of FIG. 1A.

A pilot study of the MBI system 100 has been conducted with patients having a primary diagnosis of acute decompensated heart failure. The patients were assessed with bodily imaging technology to correlate thoracic fluid measurement with a clinical scenario of congestive heart failure. The MBI system 100 can provide personalized measures to the patient, which can be used to help determine how close the patient is to a "dry" status. Fluid levels obtained by the bodily imaging system 100 were compared to the total net fluid volume loss during hospitalization. Patients were assessed daily to correlate thoracic fluid measurement with clinical scenario of congestive heart failure. FIG. 12A shows raw sensor readings captured as an image in which the depth of echo-producing interfaces is displayed along one axis with time (T) along the second axis; motion (M) of the tissue interfaces toward and away from the transducer (similar to TM mode of ultrasound). Note that the motion of the lung tissue due to respiration is visible and help to identify the relevant tissue transitions. FIG. 12B is a plot showing a comparison of the net fluid volume loss (in liters) to the standardized thoracic fluid measure provided by the MBI system 100. The data was collected from the study subject over eight days.

Figure 13:
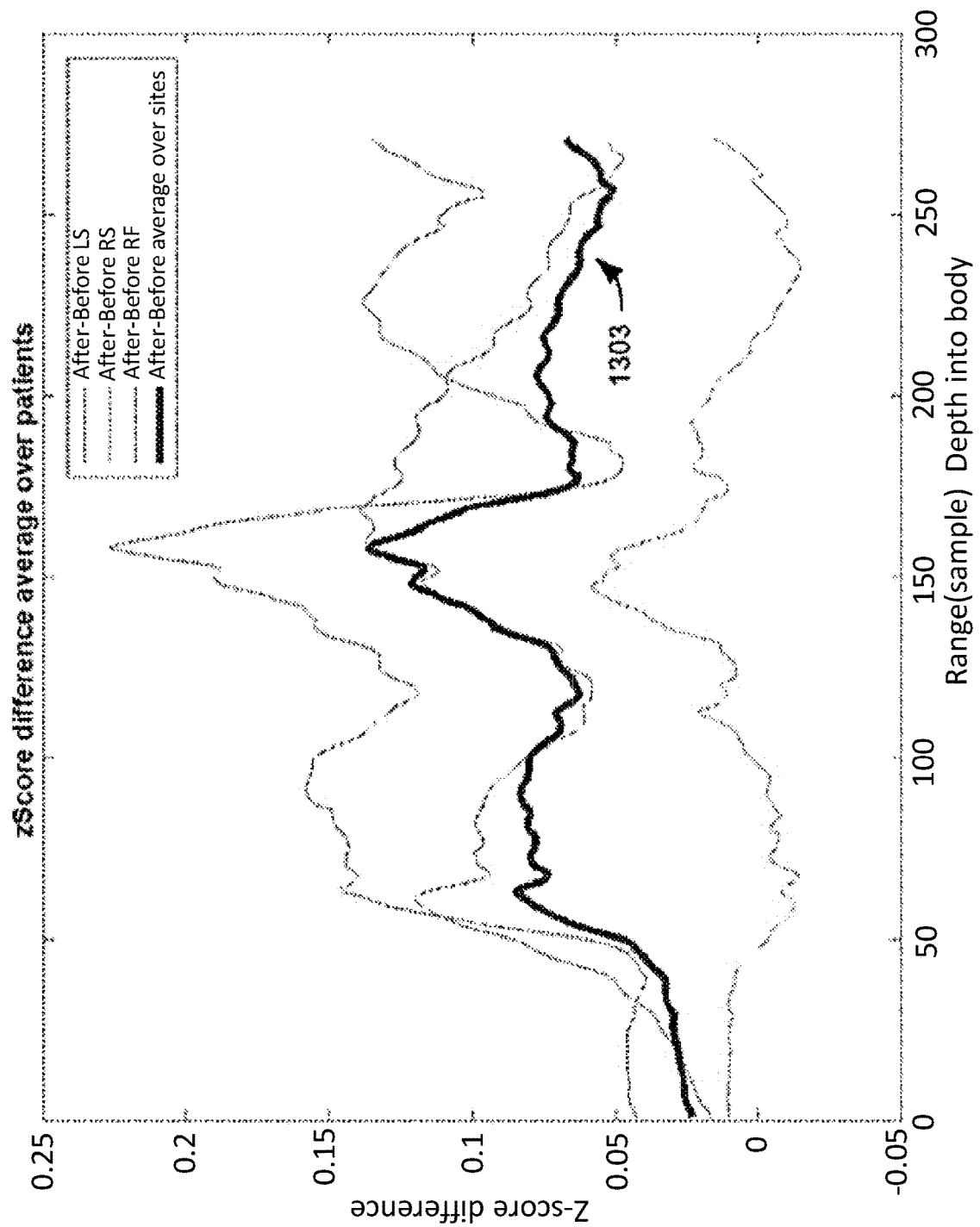
FIG. 13 illustrates data generated in a pilot study using the bodily imaging system of FIG. 1A.
Figure 14A:
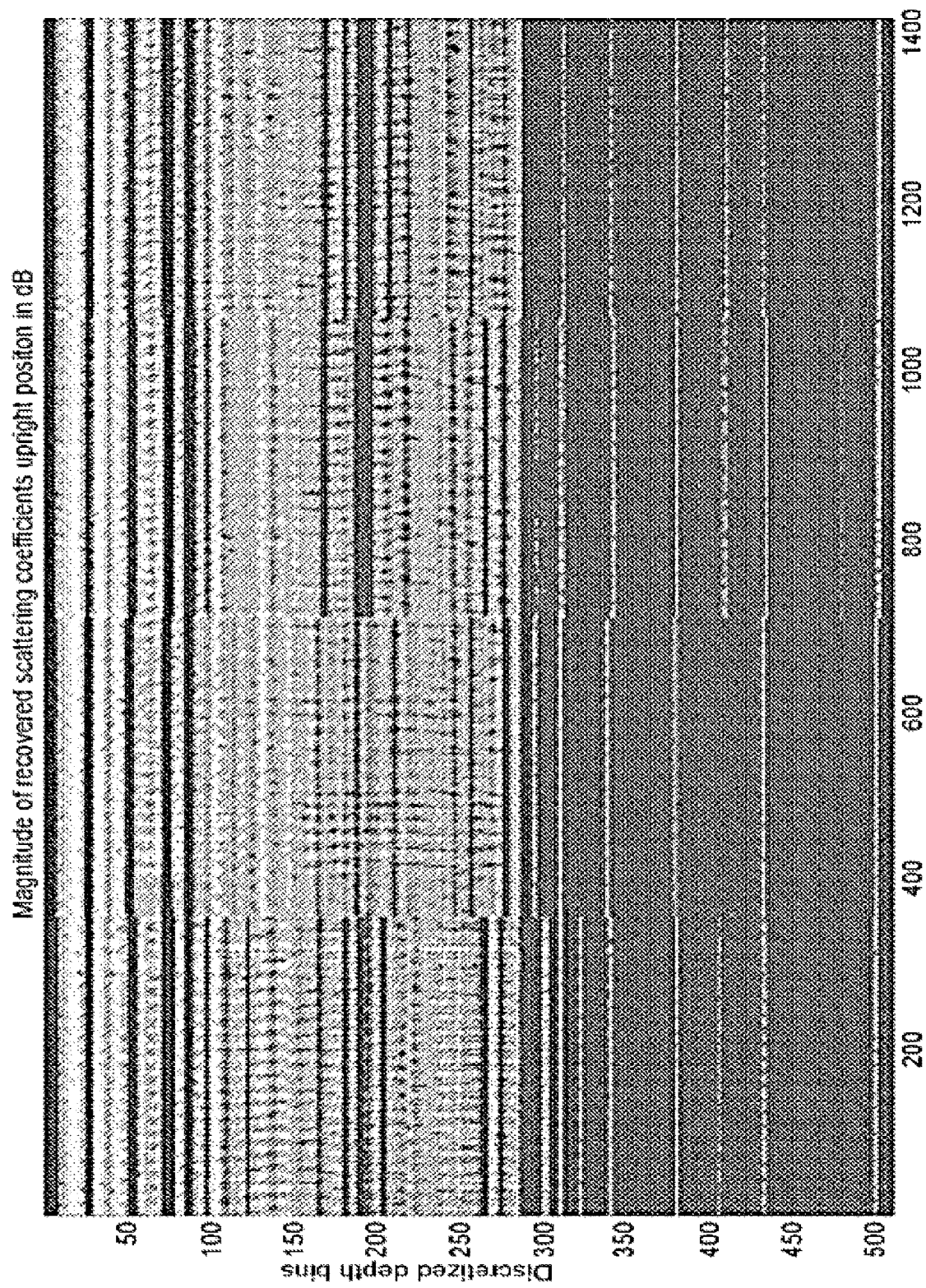
FIG. 14A illustrates an example of backscatter data from pilot study results using the bodily imaging system of FIG. 1A.
Figure 14B:
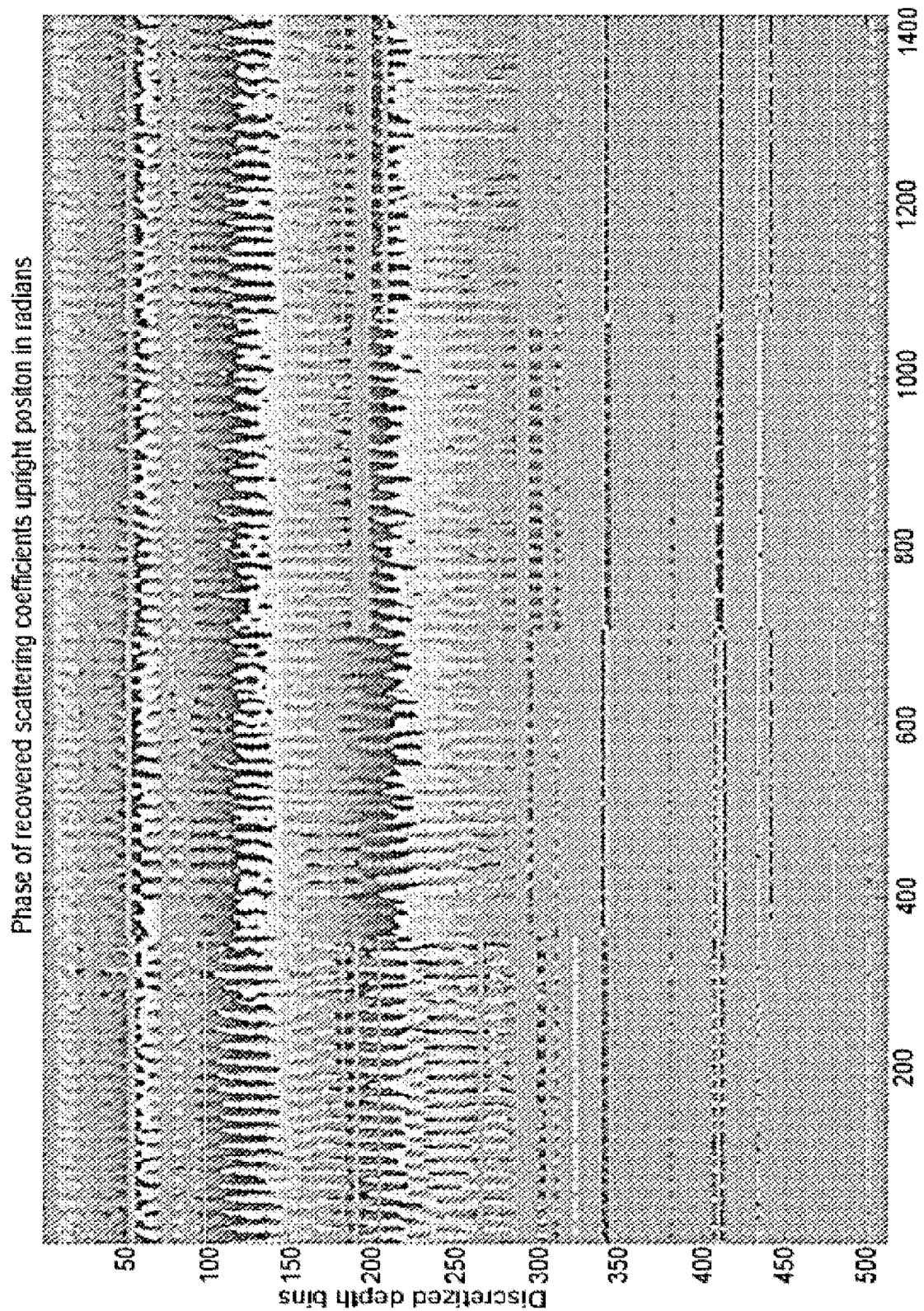
FIG. 14B illustrates an example of backscatter data from pilot study results using the bodily imaging system of FIG. 1A.
Figure 14C:
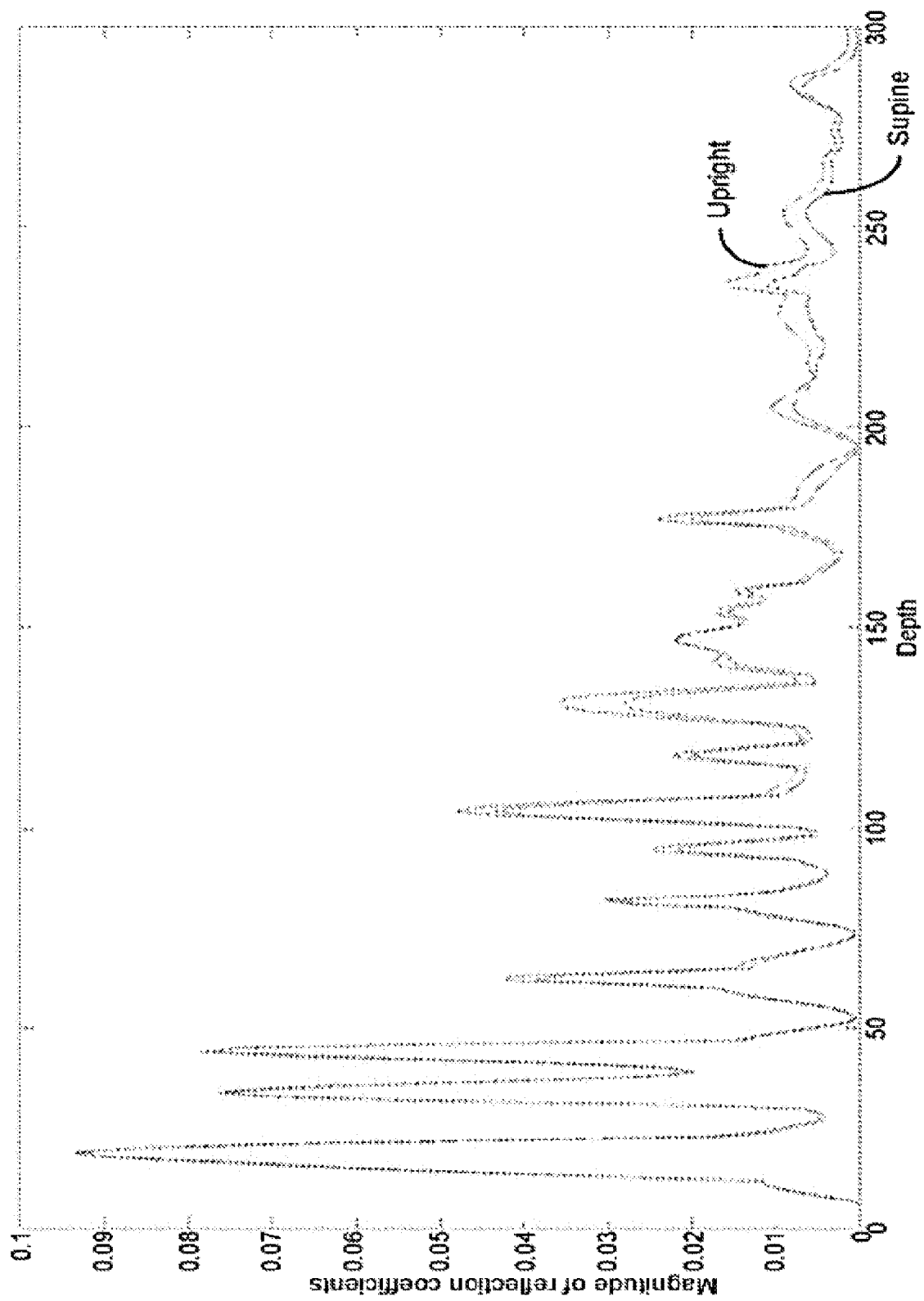
FIG. 14C illustrates data generated in a pilot study using the bodily imaging system of FIG. 1A.
Figure 14D:
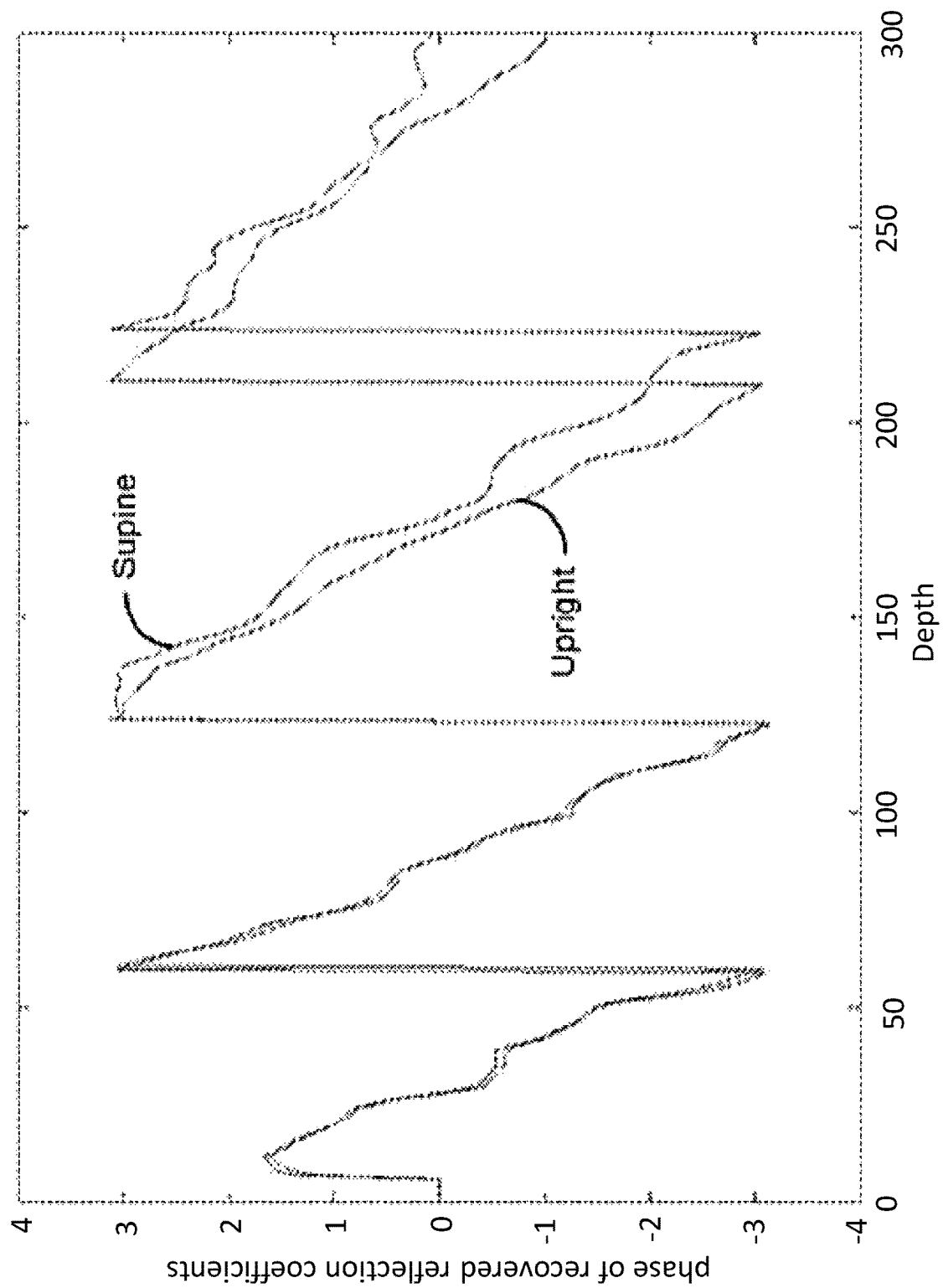
FIG. 14D illustrates data generated in a pilot study using the bodily imaging system of FIG. 1A.

FIG. 13 shows a plot of an example of the average phase of the reflection coefficients over the depth (or range) into the body. Curve 1303 being above zero shows drying of the lungs especially at two compartments. Controlled repeated experiments were also carried out with a turntable. FIGS. 14A and 14B show the raw data of the backscatter magnitude and phase, respectively. The magnitude shows a layered structure of tissues, while the phase shows variation in time due to respiration. The recovered layered structure magnitude and phase for the average over respiration is plotted in FIGS. 14C and 14D, respectively. As can be seen, both the magnitude and phase show changes in fluid levels deep in the body. The peaks and valleys of the respiration cycle can also be recovered.

Figure 15:
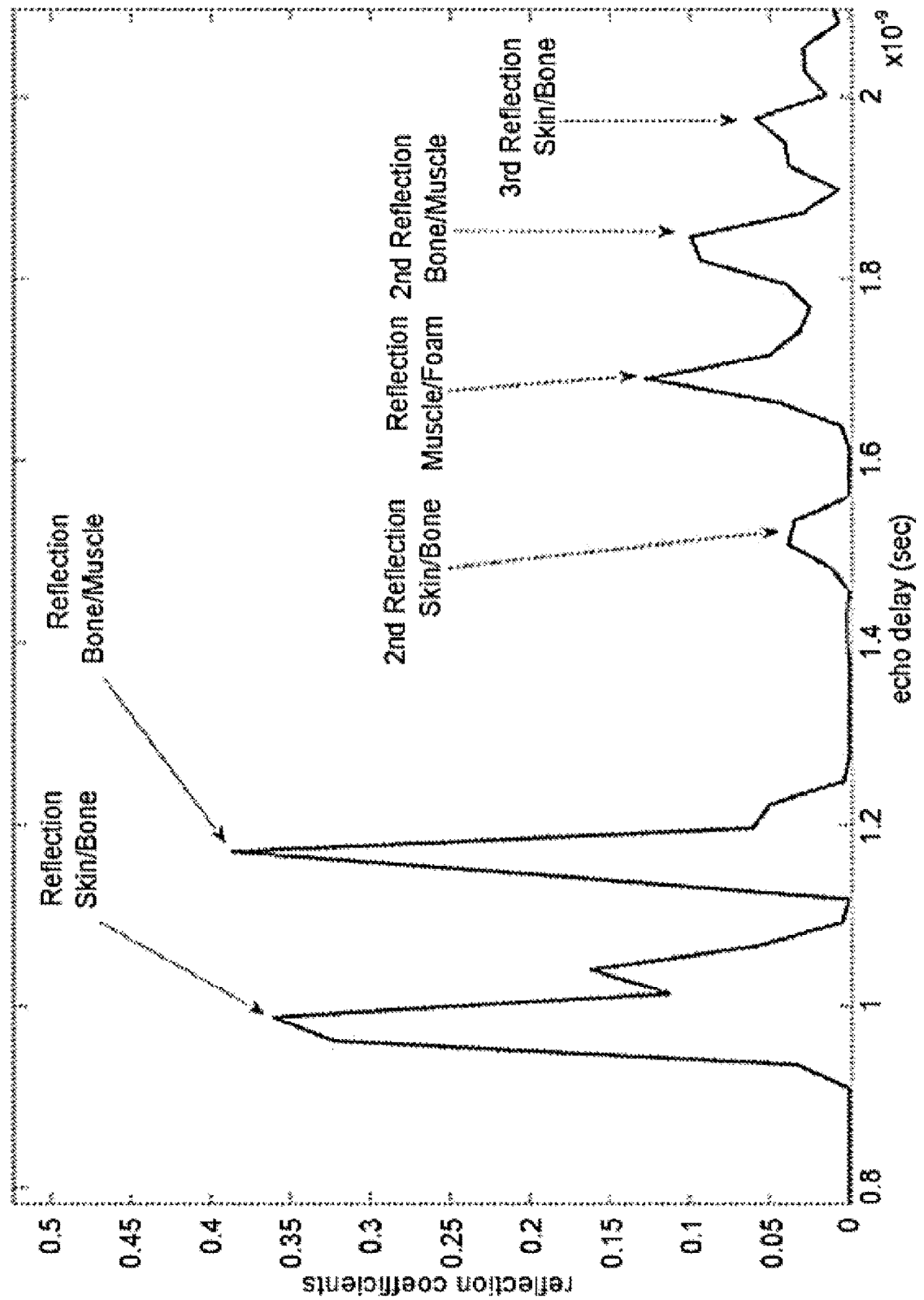
FIG. 15 illustrates an example of measured reflection coefficients using a multi-tissue phantom.

To test the validity of the measurements provided by MBI system 100, a multilayer phantom consisting of three tissue layers (skin, bone, and muscle) was created and placed against a foam layer of known dielectric coefficient. The dielectric coefficient (permittivity and conductivity) of the emulated tissue layers were adjusted using polyethylene powder ("PEP") and sodium chloride, respectively. Agar was used for self-shaping the mixture into solid layers, and a TX-151 powder was used to increase the mixture's viscosity. The dielectric constant of the emulated tissues was verified using an Agilent 85070E dielectric probe kit. The measured dielectric coefficients of the emulated tissue were compared against reference values, and the measured conductivity and permittivity were found to be consistent with the reported values for these tissue types. FIG. 15 shows depth vs reflection amplitude measurements (similar to ultrasound A-mode). The observed delays and the reflection amplitudes can be used to estimate the dielectric properties of the multilayer tissue profile. For the three layers (skin, bone, and muscle), the magnitudes of the estimated dielectric coefficients were (41, 12, and 55) within an average error of 4.5%.

The above-described aspects of the present disclosure are merely possible examples of implementations set forth for a clear understanding of the principles of the disclosure. Many variations and modifications may be made to the above-described aspect(s) without departing substantially from the spirit and principles of the disclosure. All such modifications and variations are intended to be included herein within the scope of this disclosure and protected by the following claims.

To make the data obtained using MBI system 100 more useful to physicians wishing to assess a patient's lung fluid level, processing of the backscatter data can be carried out by a computing device, for example, computing device 1103. The objective is to create an image from the data so that the data can be further interpreted.

Figure 16:
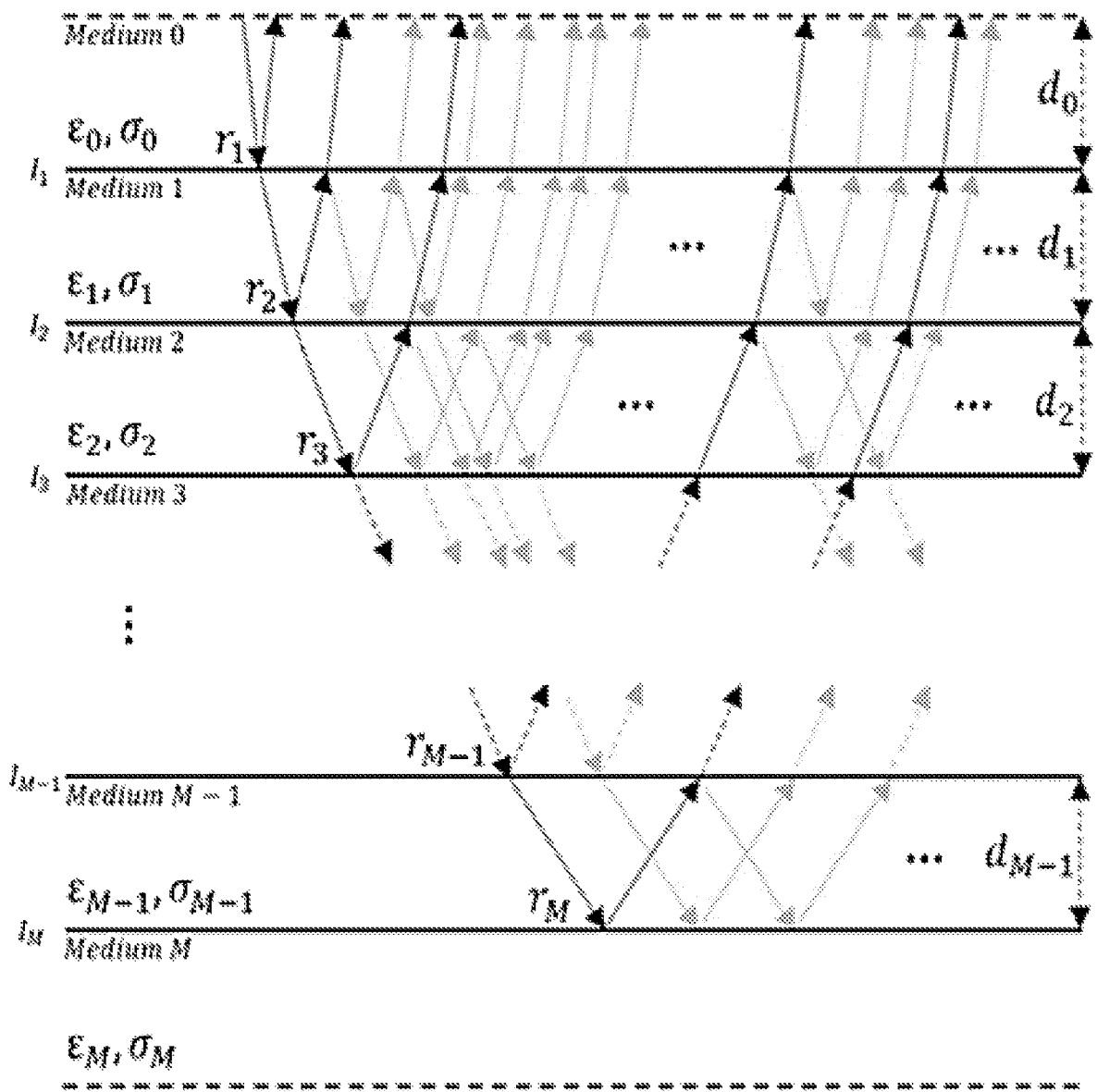
FIG. 16 illustrates signal reflections generated at the boundaries of various tissues being analyzed by the MBI system of FIG. 1A.

FIG. 16 illustrates signal reflections generated at the boundaries, or interfaces, of various tissues being analyzed by MBI system 100. Medium 0 may be skin tissue, Medium 1 may be fat tissue, Medium 2 may be muscle tissue, and Medium 3 may be lung tissue. Interface $I_1$ may be the skin-fat interface, Interface $I_2$ may be the fat-muscle interface, and Interface $I_3$ may be the muscle-lung interface.

Each new layer of tissue causes an exponential increase in the number of signal reflections because each time a wave is sent into the body, that wave gets at least partially trapped between the different tissue layers. Each tissue interface causes multiple signal reflections, each with a reduced amplitude relative to the last.

In the example of a 1D setting, with plane waves having normal incidence to planar tissue surfaces, the total reflection coefficient at an Interface $I_i$ may be expressed as:

$$X_i(\omega) = \frac{r_i + X_{i+1}(\omega)e^{-2\alpha_i d_i}e^{-j2\beta_i d_i}}{1 + r_i + X_{i+1}(\omega)e^{-2\alpha_i d_i}e^{-j2\beta_i d_i}}$$

where $$\alpha_i = \omega\sqrt{\mu_o \varepsilon_o \varepsilon_i}\left\{\frac{1}{2}\left[\sqrt{1+\left(\frac{\sigma_i}{\omega\varepsilon_o\varepsilon_i}\right)^2}-1\right]\right\}^{1/2}$$

$$\beta_i = \omega\sqrt{\mu_o \varepsilon_o \varepsilon_i}\left\{\frac{1}{2}\left[\sqrt{1+\left(\frac{\sigma_i}{\omega\varepsilon_o\varepsilon_i}\right)^2}-1\right]\right\}^{1/2}$$

The response at do meters from interface $I_i$ may be expressed as:

$$X_0(\omega) = X_1(\omega)e^{-2\alpha_0 d_0}e^{-j2\beta_0 d_0}$$

Figure 17:
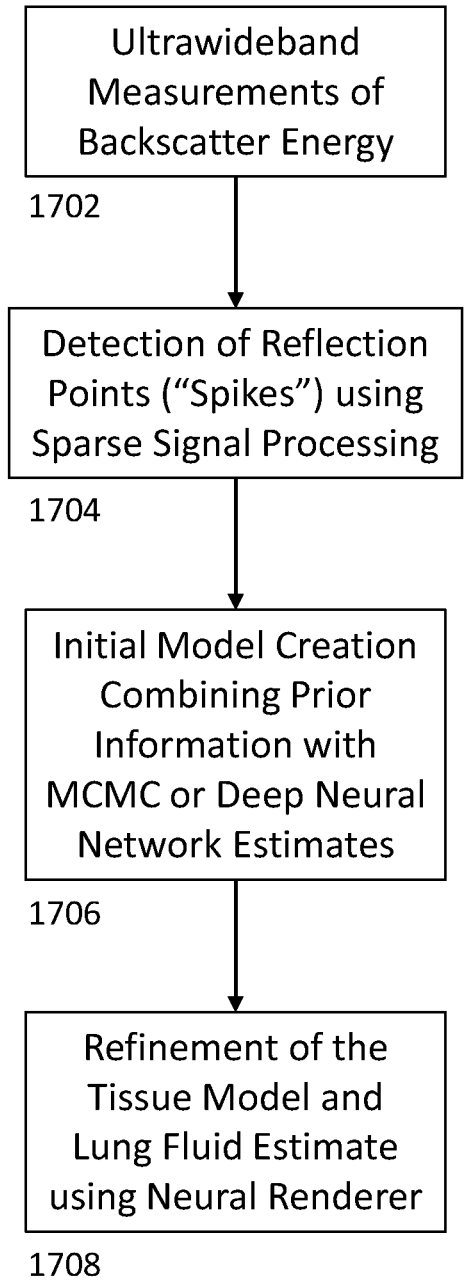
FIG. 17 is a flow chart illustrating a process for model generation.
Figure 18:
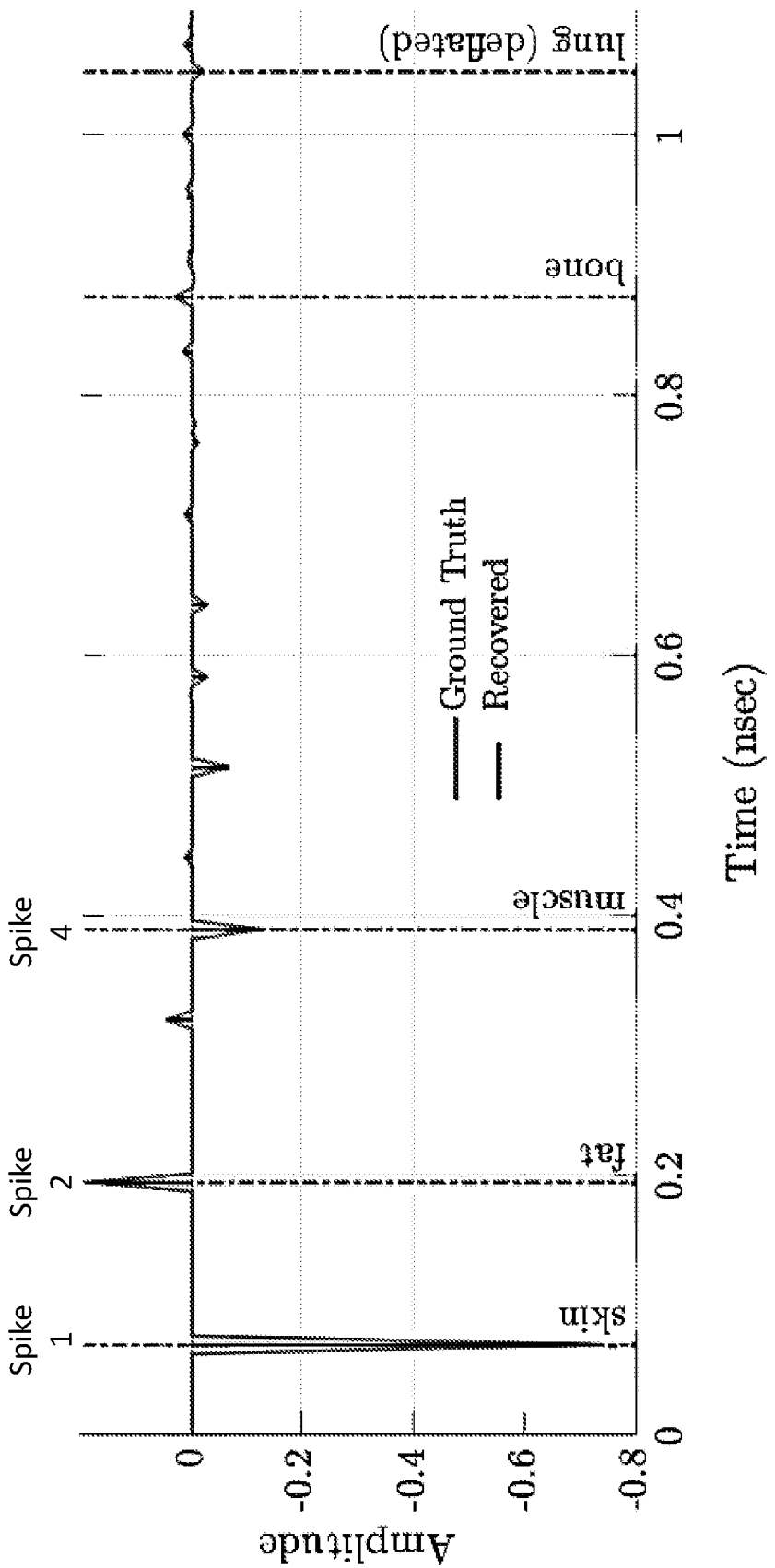
FIG. 18 illustrates a graph generated using the sparse imaging process on data obtained from the bodily imaging system of FIG. 1A.
Figure 19:
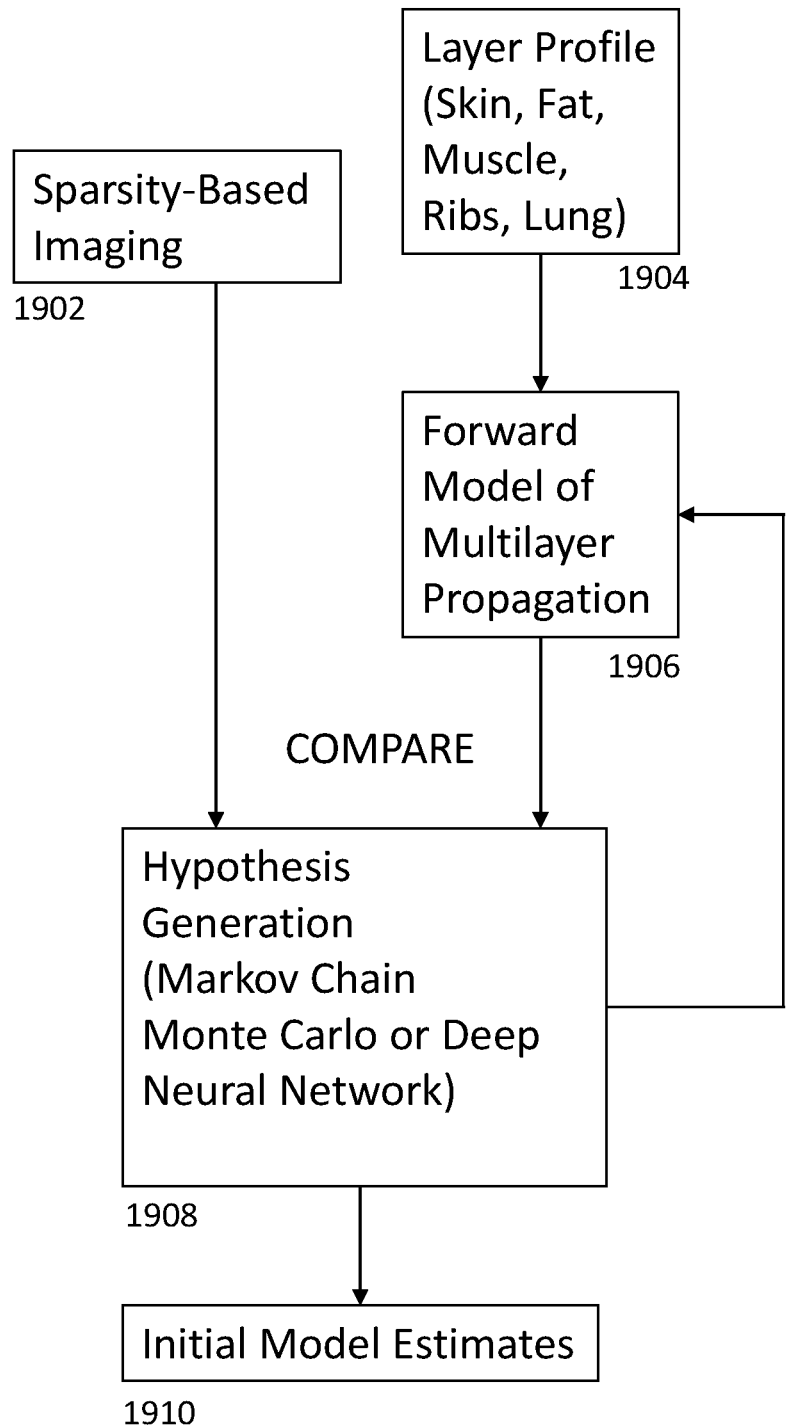
FIG. 19 is a flow chart illustrating a first pass initial model generation.

FIG. 17 is a flow chart illustrating a process for model generation to identify a lung tissue interface and thereby identify lung fluid content. The process includes assembling ultrawideband measurements of backscatter energy at 1702, as described above. The process includes detection of reflection points ("spikes") using sparse signal processing at 1704, as described above. An illustration of the "spikes" is shown in FIG. 18 and described further below. The process includes initial model creation combining prior information with Markov Chain Monte Carlo or Deep Neural Network estimates at 1706. An illustration of the initial model creation is illustrated in FIG. 19 and described further below. The process includes refinement of the tissue model and lung fluid estimate using a neural renderer at 1708. An illustration of the refinement is illustrated in FIGS. 20, 21A, 21B, 22A, and 22B, and described further below.

FIG. 18 illustrates a graph generated using the sparse imaging process on data obtained from the bodily imaging system. Each tissue interface contributes to multiple echoes, which are illustrated as spikes in the graph. The result of the multiple reflections is that there are many more spikes than tissue interfaces. The graph includes dashed lines illustrating the tissue interfaces of interest and showing along the X-axis (time in seconds) where that particular tissue was first encountered. That is, the graph shows the time associated with the encountering of skin, fat, muscle, bone, and lung (deflated) tissues.

As illustrated, the relative amplitude of the skin or fat tissues is much larger than that of the lung tissue. Also illustrated is an exponential increase in the number of spikes in the graph as the "deeper" tissues are uncovered, due to the exponential increase in the number of signal reflections discussed above with respect to FIG. 16. Thus, determining which tiny return spike represents the lung tissue requires modeling of the data-tissue profile and matching what one expects to see in the data as discussed further below.

FIG. 19 is a flow chart illustrating a first pass initial model generation. As described above, sparsity-based imaging at 1902 is applied to data obtained from the bodily imaging system to initially identify all spikes with appreciable amplitude where signal reflections exist, as illustrated in FIG. 18. As discussed above, at this stage there are many more spikes than tissue interfaces due to the multiple reflections.

Some a priori information is known at this point in the process, including where on the body these measurements are taken (e.g., from the front of the right lung). A model is created (a layer profile) including skin, fat, muscle, ribs, and lung tissues at 1904. This tissue model is adjusted based upon the signal returns, and tissue properties such as approximate thicknesses and water content are determined. From this information, a forward model of multilayer propagation is created at 1906, based upon the physics of multilayer propagation.

At this point, an estimate is made regarding the returns that the sensor (e.g., the UWB sensor) should generate if the forward model of multilayer propagation at 1906 is correct. Initially, the forward model of multilayer propagation is not exactly correct, determined by comparing what the sensor generates (at 1902) and what was predicted (at 1904), and thus a hypothesis is generated at 1908 based upon the comparison. The hypothesis generation may use a Markov Chain Monte Carlo method (a statistical way of generating additional hypotheses) or a Deep Neural Network method (comparing the differences between the sensor's generated signal (at 1902) and what was predicted (at 1904), and trying to create a better prediction (at 1904)).

The Markov Chain Monte Carlo method creates numerous choices with associated likelihood scores, and the most likely one is selected for the purposes of the generation of the hypothesis.

The Deep Neural Network method points the hypothesis in the direction of what is more likely to yield a more accurate, and closer, comparison between what is predicted and what is shown.

The process includes multiple iterations of adjusting the forward model of multilayer propagation at 1906 based upon the hypothesis generated at 1908, comparing the new model of multilayer propagation to the sparsity-based imaging at 1902, and generating a new hypothesis at 1908, until the comparison is within a pre-established threshold to select a model of multilayer propagation as the initial model estimate at 1910. The objective is to settle on an initial model estimate of tissue thicknesses and permittivity values.

The initial model estimate generated at 1910 is expected to be inaccurate for a number of reasons. For example, the forward model of multilayer propagation is based upon the assumption that the tissues are stacked in a one-dimensional ("1D") plane whereas the tissues are actually curved. As another example, the forward model of multilayer propagation assumes that the sensor is sending plane waves, but the sensor is actually sending spherical waves. Thus, the initial model estimate generated at 1910 is intended to be a quickly attained estimate that may be used for additional analysis as described below. Thus, the initial model estimate generated at 1910 may be as much as 10%-15% off from the actual values (from more invasive and controlled tests).

As illustrated in FIG. 18, sparse imaging at 1902 yields a graph having a spiked profile and the spikes have amplitudes. The forward model of multilayer propagation at 1906 is essentially guessing at the proper location of the dashed lines illustrated in the graph of FIG. 18, as well as the amplitudes of the graph at those locations. The spike sequence generated from the model at 1906 is compared with the spike sequence illustrated by the data at 1902. As the physics relied upon to generate the model at 1906 is not actually entirely accurate (as described above), the initial model estimate at 1910 is not entirely accurate. However, it may be beneficial to use the large, and relatively few, initial spikes (e.g., pertaining to skin, fat, and muscle) as a tool to assist in properly locating the subsequent spikes. That is, if one can correctly guess spikes 1, 2, and 4 of the graph shown in FIG. 18, then one can use that to estimate the locations and amplitudes of the subsequent spikes when generating the model at 1906. In this manner, if one can accurately identify the relatively "shallower" skin, fat, and muscle tissues, then one can use that information to more accurately identify the relatively "deeper" lung tissue.

Figure 20:
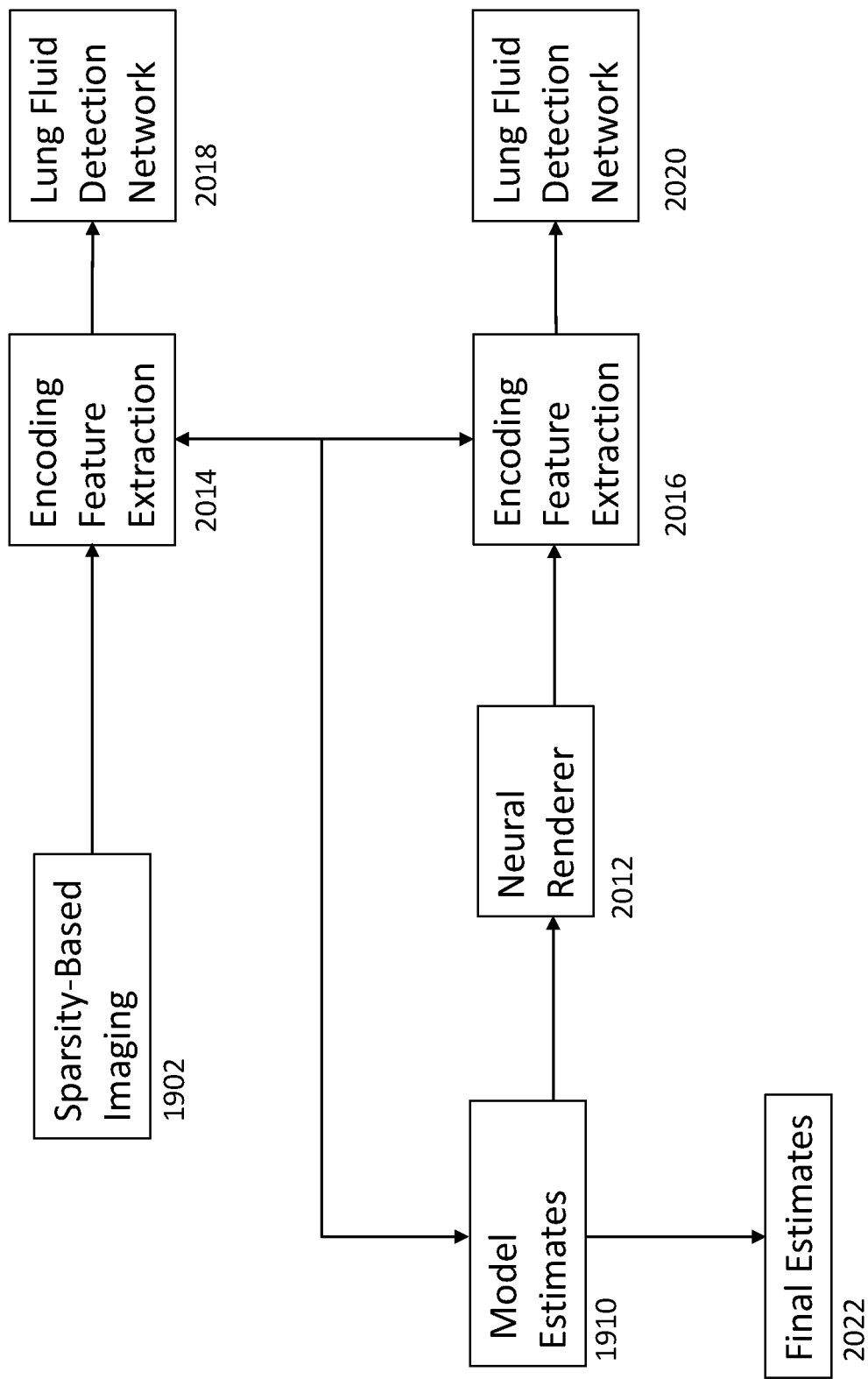
FIG. 20 is a flow chart illustrating a final model generation.

FIG. 20 is a flow chart illustrating a final model generation. The model estimates illustrated are those of 1910, and the sparsity-based imaging is that of 1902, each of which is described above.

Figure 21A:
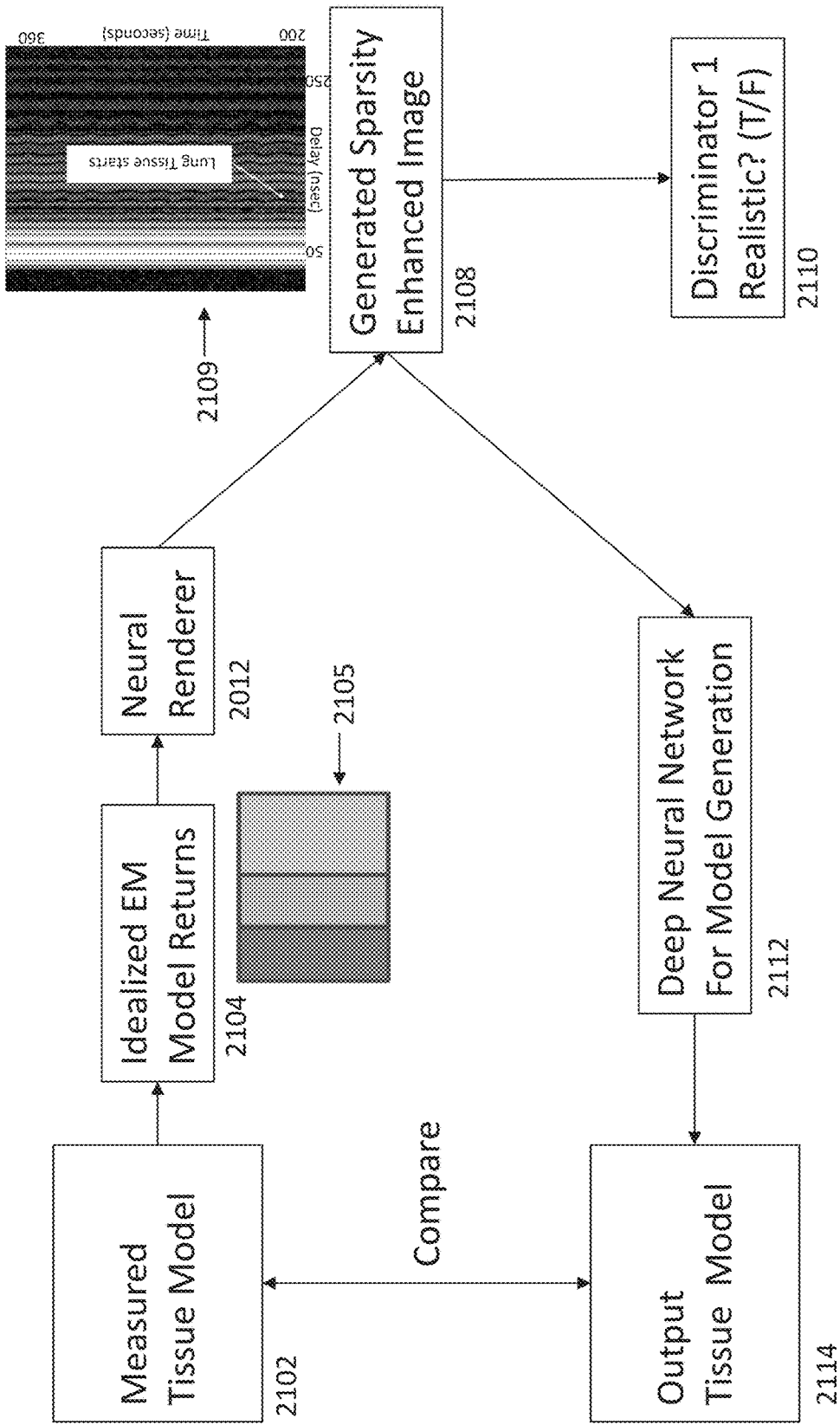
FIG. 21A is a flow chart illustrating the training of the neural renderer to form the forward and inverse model relationship.
Figure 22A:
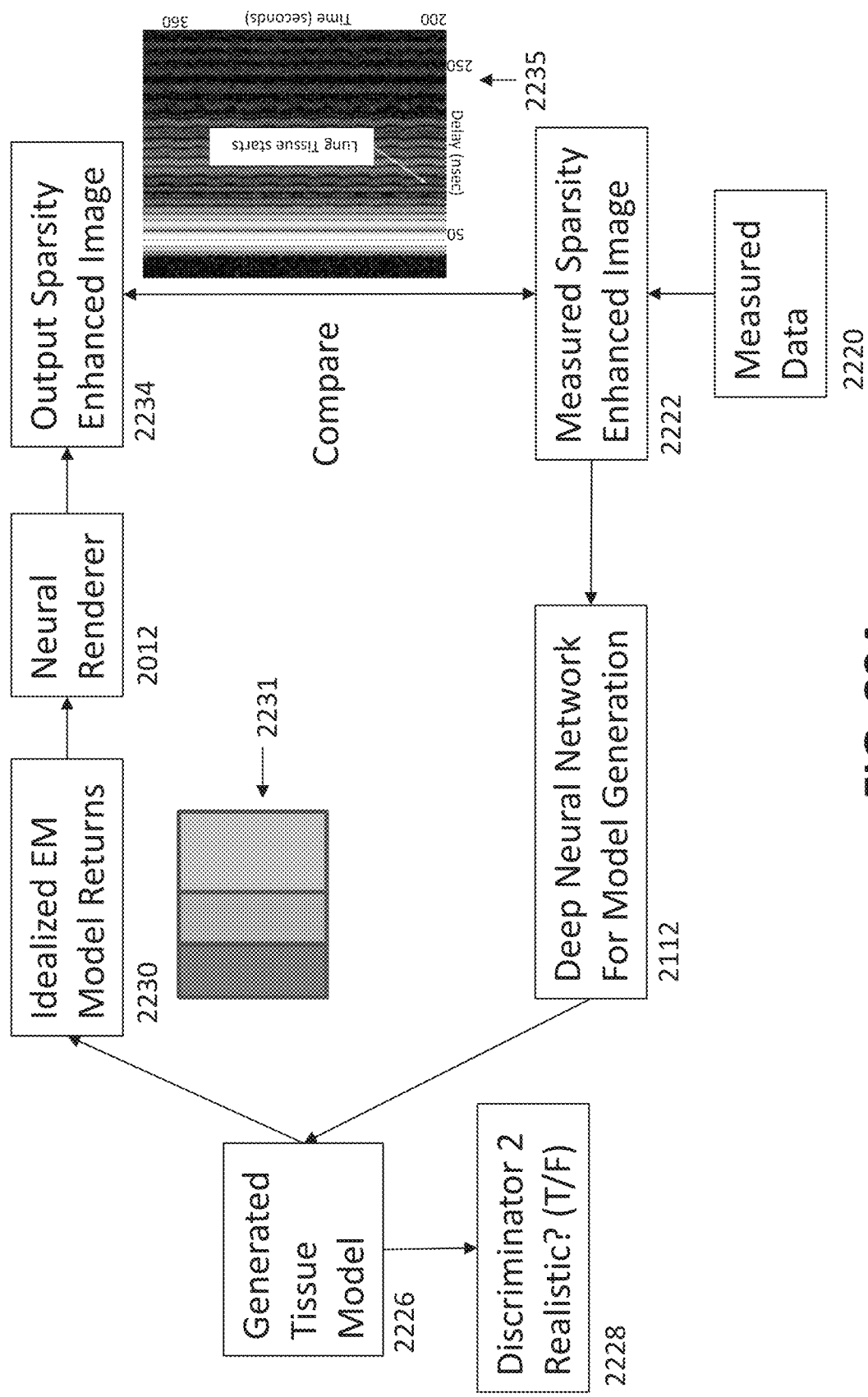
FIG. 22A is a flow chart illustrating the training of the Deep Neural Network to form the forward and inverse model relationship.

The process includes a neural renderer at 2012. The neural renderer is provided with enough confirmed data that it can accurately predict how the real sensor output data spike sequence should look (that is, it can render realistic amplitudes for model estimates) given the model parameters (thickness and permittivity values of tissue layers). The neural renderer is thus capable of creating realistic graphs based upon what the sensor's data should provide, accounting for effects such as non-ideal antenna response, spherical wave propagation and non-homogenous tissue media (like muscle tissue intertwined with fascia and the like). The neural renderer can be trained using generative adversarial network techniques, such that a separate discriminator (discriminator 2110 in FIG. 21A) is trained to judge the output of the neural renderer in parallel to the renderer. The neural renderer can also be trained in tandem with the Deep Neural Network discussed above to form a forward and inverse model relationship. FIGS. 21A and 22A are flow charts illustrating the parallel training of the neural renderer in tandem with the Deep Neural Network to form the forward and inverse model relationship. This tandem training of the neural renderer and Deep Neural Network allows the system to accurately predict how the real sensor output data spike sequence should look (that is, it can render realistic amplitudes for model estimates) given the model parameters (thickness and permittivity values of tissue layers).

The neural renderer training illustrated in FIG. 21A begins with inputting a measured tissue model 2102. Measured tissue model 2102 may originate from a bank of tissue model images (e.g., form CT scan images of thoracic cavities). This bank of images may include public databases of thoracic cavity CT scans. This bank of images may include computer simulations. This bank of images may include phantoms. Measured tissue model 2102 does not have to originate from patients currently under the observation of the MBI system. Rather, measured tissue model 2102 can be a generic tissue model, average tissue model, or similar (to the current patient) tissue model found in the bank of images.

Next, idealized EM model returns 2104 are formed from measured tissue model 2102. Idealized EM model returns 2104 may be graphically represented in the form of an idealized model return diagram 2105 configured to illustrate the various tissue layers and associated thicknesses. Idealized EM model returns 2104 are subjected to and refined by neural renderer 2012. Following refinement by neural renderer 2012, a generated sparsity enhanced image 2108 is created. Generated sparsity enhanced image 2108 may be graphically represented in the form of a backscatter diagram 2109. The output of neural renderer 2012, in the form of generated sparsity enhanced image 2108, is judged by a first discriminator 2110 to determine whether generated sparsity enhanced image 2108 is realistic. If discriminator 2110 determines that generated sparsity enhanced image 2108 is realistic, generated sparsity enhanced image 2108 is identified as a realistic image for comparison in future steps. If discriminator 2110 determines that generated sparsity enhanced image 2108 is not realistic, generated sparsity enhanced image 2108 is identified as an unrealistic image for comparison in future steps.

Generated sparsity enhanced image 2108 is modified using the Deep Neural Network for model generation 2112, to generate an output tissue model 2114. Output tissue model 2114 is compared to measured tissue model 2102. Where output tissue model 2114 is not within a predetermined degree of similarity to measured tissue model 2102, neural renderer 2012 may be adjusted and the process repeated until output tissue model 2114 and measured tissue model 2102 are within a predetermined degree of similarity. In this manner, neural renderer 2012 is trained to produce more accurate results.

Figure 21B:
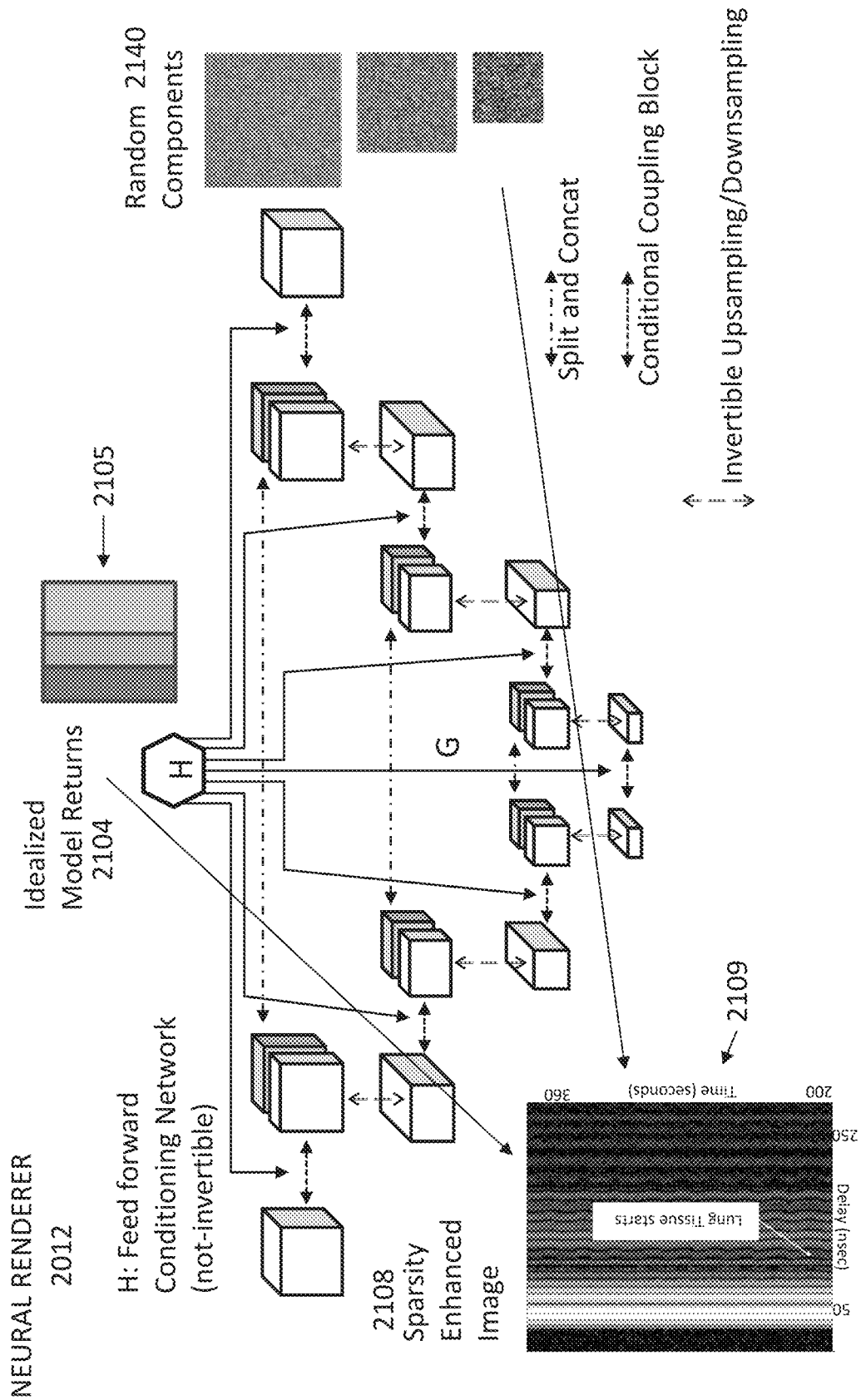
FIG. 21B is a schematic diagram illustrating the training of the neural renderer to form the forward and inverse model relationship.

FIG. 21B is a schematic diagram illustrating the training of the neural renderer to form the forward and inverse model relationship described above. In one aspect, neural renderer 2012 combines an invertible neural network G with a feedforward network H. Invertible network G transforms random factors 2140 into sparsity enhanced images 2108 and vice-versa with features gleaned from the current idealized model return 2104 by feedforward network H. Specifically, various hypothetical sparsity enhanced images 2108 are obtained by combining current model return 2104 features with random factors 2140 and shaped by invertible neural network G. Here, the non-invertible feedforward network H computes features from the current model return 2104 and feeds them into the invertible network G. Feedforward network H and invertible network G are trained with training data that comprises pairs of idealized model returns 2104 and sparsity enhanced images 2108 obtained through computer simulations, phantoms, and/or live subject experiments with CT scans providing the model returns 2104. Invertible network G is tuned to transform the pairs into random factors 2140, and back. Once trained, invertible network G is used in the reverse direction from random factors 2140 and idealized model returns 2104 into sparsity enhanced images 2108.

The Deep Neural Network training illustrated in FIG. 22A begins with inputting measured data 2220. Measured data 2220 is acquired from the UWB sensors used in the MBI system. Measured data 2220 and measured tissue model 2102 (illustrated in FIG. 21A) are not required to have been measured from the same patient, or at the same time. Rather, measured tissue model 2102 can be a generic tissue model, average tissue model, or similar (to the current patient) tissue model found in the bank of images.

Next, measured data 2220 is used to prepare a measured sparsity enhanced image 2222. Measured sparsity enhanced image 2222 is modified using Deep Neural Network for model generation 2112, to generate a generated tissue model 2226. The output of Deep Neural Network for model generation 2112, in the form of generated tissue model 2226, is judged by a second discriminator 2228 to determine whether generated tissue model 2226 is realistic. If discriminator 2228 determines that generated tissue model 2226 is realistic, generated tissue model 2226 is identified as a realistic image for comparison in future steps. If discriminator 2228 determines that generated tissue model 2226 is not realistic, generated tissue model 2226 is identified as an unrealistic image for comparison in future steps.

Next, idealized EM model returns 2230 are formed from generated tissue model 2226. Idealized EM model returns 2230 may be graphically represented in the form of an idealized model return diagram 2231 configured to illustrate the various tissue layers and associated thicknesses. Idealized EM model returns 2230 are subjected to and refined by neural renderer 2012. Following refinement by neural renderer 2012, an output sparsity enhanced image 2234 is created. Generated sparsity enhanced image 2234 may be graphically represented in the form of a backscatter diagram 2235.

Output sparsity enhanced image 2234 is compared to measured sparsity enhanced image 2222. Where output sparsity enhanced image 2234 is not within a predetermined degree of similarity to measured sparsity enhanced image 2222, Deep Neural Network for model generation 2112 may be adjusted and the process repeated until output sparsity enhanced image 2234 and measured sparsity enhanced image 2222 are within a predetermined degree of similarity. In this manner, Deep Neural Network for model generation 2112 is trained to produce more accurate results.

Figure 22B:
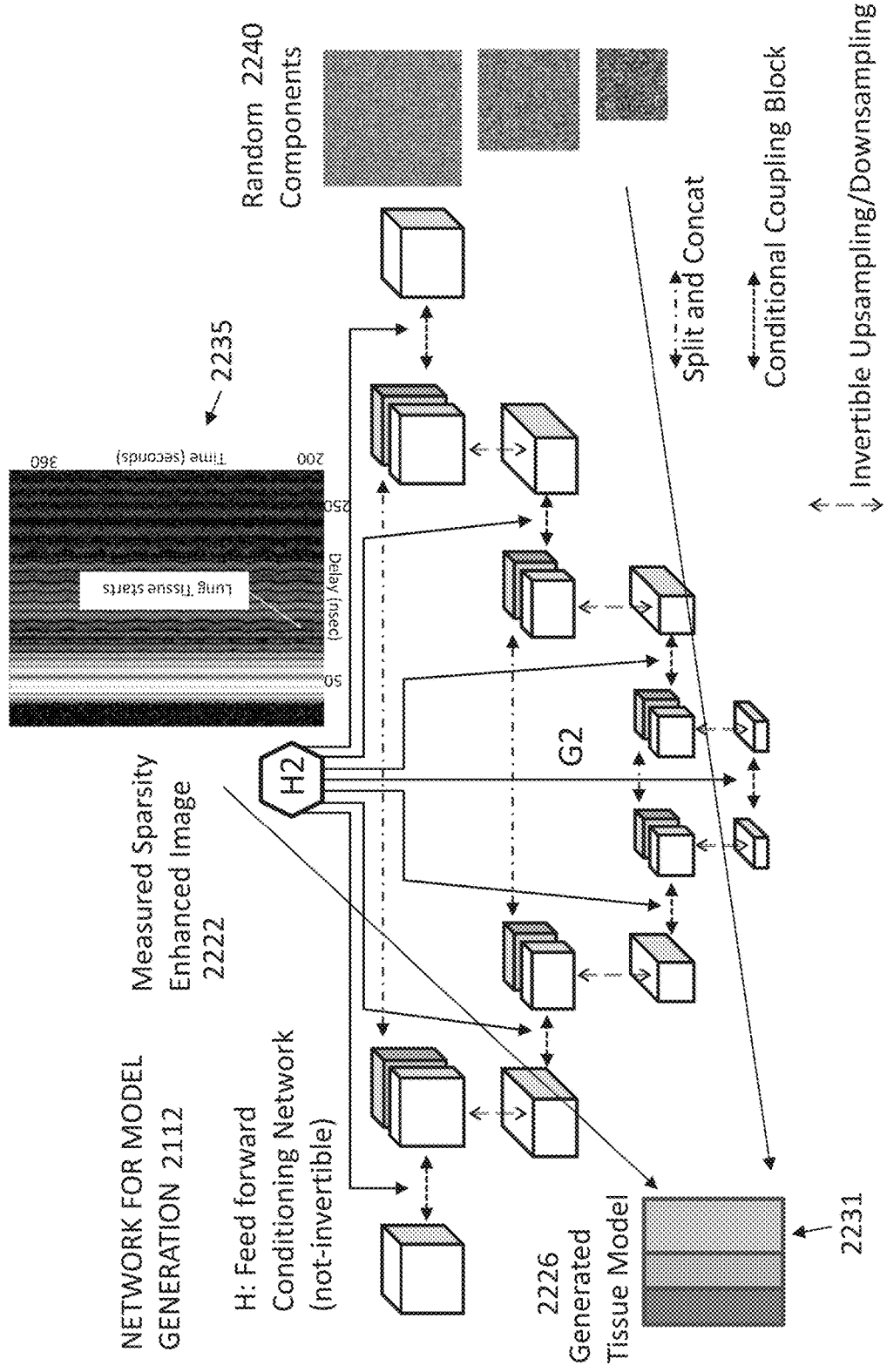
FIG. 22B is a schematic diagram illustrating the training of the Deep Neural Network to form the forward and inverse model relationship.

FIG. 22B is a schematic diagram illustrating the training of the Deep Neural Network to form the forward and inverse model relationship. In one aspect, deep neural network 2112 model estimates are formed by an invertible neural network G2 and a feedforward network H2. Invertible network G2 transforms random factors 2240 into generated tissue model 2226 and vice-versa with features gleaned from the current measured sparsity enhanced image 2222 by feedforward network H2. Specifically, various hypothetical tissue models are obtained by combining features gleaned from the measured sparsity enhanced images 2222 with random factors 2240 and shaped by invertible neural network G2. Here, the non-invertible feedforward network H2 computes features from measured sparsity enhanced image 2222 into invertible network G2. Feedforward network H2 and invertible network G2 is trained with training data, that comprises pairs of generated tissue models 2226 and measured sparsity enhanced images 2222 obtained through computer simulations, phantoms, and/or live subject experiments with CT scans providing the generated tissue model 2226. Invertible network G2 is tuned/trained to transform the pairs into random factors 2240 and back. Once trained, invertible network G2 is used in the reverse direction from random factors 2240 and measured sparsity enhanced images 2222 into generated tissue model 2226.

The model estimate from 1910 is compared to the neural renderer at 2012. The comparison of what the neural renderer shows at 2012 versus the model estimate at 1910 focuses on the subsequent spikes in the graph that are at or near the lung tissue; the lung tissue spikes are where the model estimate and the neural renderer are to be matched.

However, to achieve a more focused comparison upon the subsequent spikes in the graph that are at or near the lung tissue, both the sparsity-based imaging at 1902 and the neural renderer imaging at 2012 are subjected to encoding feature extraction at 2014 and 2016, respectively. Encoding feature extraction at 2014, 2016 is achieved by extracting some features and training the feature extractions at 2014, 2016 using lung fluid detection networks 2018 and 2020, respectively. Lung fluid detection networks 2018 and 2020 produce lung fluid indicators to help the system focus on data that is important to determine the lung fluid. The extracted features are those that are instrumental in determining a lung fluid content. In this manner, the system forces the features being extracted to be relevant to the task of lung fluid detection. The result is a trained system that compares the sparsity-based imaging at 1902 to the neural renderer imaging at 2012 based upon the extracted features, and reiterates the model estimates from 1910 based upon that comparison. After a predetermined number of iterations, and/or based upon a predetermined threshold of the difference between the compared imaging, a final estimate is created at 2022.

Lung fluid detection networks 2018 and 2020 are trained so that the networks 2018, 2020 are able to train encoding feature extractions at 2014, 2016. This enables the system to automatically identify where the lung tissue is located without input from a human. This training of the encoding feature extractions at 2014, 2016 permits the system to focus on the lung parts of the signal returned by the sensor, because the system knows where to look in the general data for the lung tissue-specific data.

The final estimate at 2022 is in the form of thicknesses of each tissue layer and the liquid content of each tissue layer. The final estimate at 2022 will include the percentage liquid of the lung tissue.

The final estimate at 2022 may generate a graph that is the same as that illustrated in FIG. 18, with an indication of skin, fat, bone, muscle, and lung tissue marked for the physician with dashed lines or similar indicators. Inside of each region there may be a liquid index epsilon.

One advantage of MBI system 100 is its ability to sense pressure and fluid in the lungs of a patient to provide an integrated measure of intravascular and extravascular lung fluid, yielding a fluid index value. MBI system 100 can detect early pressure increases in lung fluid, as well as accumulating interstitial lung fluid. Lung fluid retention in heart failure patient follows a two-compartment model—the intravascular compartment and the interstitial compartment. While existing technologies may sense pressure in one of these two compartments, MBI system 100 may detect and measure fluid content and pressure in both of these two compartments, in a single integrated measure. MBI system 100 can detect when a patient's lung is fully decongested. It is preferable to clinicians to know the quantity and pressure of fluid in both a patient's intravascular compartment and interstitial compartment, or a single integrated measure of the fluid quantity and pressure.

MBI system 100 is preferably used on a patient that is in a semi-reclined posture, which prevents fluid from accumulating in one of the patient's lung more than the other. MBI system 100 can determine the quantity and pressure of fluid in a single lung through measuring the single lung only (without a need to compare one lung to the other, or measuring both lungs).

MBI system 100 may be used as a substitute for CT scans. CT scans are not part of a standard of care for heart failure evaluation because CT scans are expensive to conduct and are often not covered by insurance carriers for most heart failure patients. Additionally, CT scans are not part of the standard of care for heart failure patients because radiation safety precludes excess or extended use of CT scans in patients.

MBI system 100 provides an early and actionable indication of worsening heart failure. This indication is a supplement to other parameters, allowing clinicians to make a better-informed decision, and in improving heart failure patient care. MBI system 100 images and/or monitors several respiratory parameters, including a patient's: breathing rate, respiratory effort, and tidal volume, any of which can be used as secondary sources of information for patient care.

In addition to identifying heart failure in patients, MBI system 100 may be used to identify a variety of conditions, including without limitation: any volume retaining or fluid related states (cirrhosis of the liver, renal failure, and the like); pulmonary edema (such as that found in COVID-19 patients); capillary leak syndrome (such as that caused by COVID-19); pneumonia, pericardial effusion; collapsed lung; and/or chronic obstructive pulmonary disease. As MBI system 100 is an imaging system, a user of MBI system 100 is able to view different tissues at different locations in a patient's body. Thus, for example, a user of MBI system 100 would be able to identify a collapsed lung and may opt to use MBI system 100 for its continuous modeling capability to continuously monitor a patient's lung where that patient is susceptible to having a collapsed lung.

MBI system 100 provides a user with the ability to image a patient's tissue with tissue layer specificity. Prior art systems (whether impedance-based or pass-through technology) average the fluid tissues from the front of a patient's chest to the back of a patient's chest. MBI system 100, on the other hand, allows a user to focus on particular tissues with greatly increased specificity in tissue spacing and layers. MBI system 100 allows tissue differentiation that is not available in prior art systems.

MBI system 100 allows a user to focus upon specific measurements at points in a patient's respiratory cycle, and to obtain at those specific points the lung pressure and expiration.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include #10% of the number. In other words, "about 10" may mean from 9 to 11. Cartesian coordinates referenced herein are intended to comply with the SAE tire coordinate system.

As stated above, while the present application has been illustrated by the description of aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A mobile bodily imaging system for determination of a lung fluid content in a lung of a patient, comprising:
    an ultrawideband pulse generator that generates one or more ultrawideband pulse and transmits the one or more ultrawideband pulse into a chest of the patient;
    an ultrawideband RF sensor positioned on the patient's chest adjacent to the patient's skin to receive reflected backscatter waves from the patient's chest;
    a sparse deconvolution inversion algorithm used to detect reflection points indicating tissue interfaces within the patient's body and create a sparsity-based image;
    an initial model generated using one or more of Markov Chain Monte Carlo or Deep Neural Network estimates; and
    a final model generated using a neural renderer,
        wherein the neural renderer is previously provided with confirmed data that permits the neural renderer to predict a form of the sparse deconvolution reflection points given previously established model parameters,
        wherein the neural renderer creates an image that is compared to the sparsity-based image, and
        wherein the neural renderer creates refined images in one or more of a predetermined number of iterations and based upon a predetermined threshold of a difference between the refined neural renderer image and the sparsity-based image.

2. The mobile bodily imaging system of claim 1, wherein the final model is a graph with an indication of the tissue interfaces within the patient's body.

3. The mobile bodily imaging system of claim 2, wherein the tissue interfaces include one or more of an interface between a patient's skin, fat, muscle, bone, and lung tissues.

4. The mobile bodily imaging system of claim 1, wherein the initial model includes multiple iterations of adjusting a forward model of multilayer propagation based upon the one or more of the Markov Chain Monte Carlo or Deep Neural Network estimates.

5. The mobile bodily imaging system of claim 4, wherein the forward model of multilayer propagation is compared to the sparsity-based image.

6. The mobile bodily imaging system of claim 1, wherein the neural renderer accounts for effects in the final model such as a non-ideal antenna response, a spherical wave propagation, and a non-homogenous tissue media.

7. The mobile bodily imaging system of claim 1, wherein the sparsity-based image and neural renderer image are subjected to encoding feature extraction.

8. The mobile bodily imaging system of claim 7, wherein the encoding feature extraction is achieved using one or more lung fluid detection networks.

9. The mobile bodily imaging system of claim 8, wherein the one or more lung fluid detection networks produce lung fluid indicators.

10. The mobile bodily imaging system of claim 1, wherein the final model indicates thicknesses of tissues of the patient.

11. The mobile bodily imaging system of claim 1, wherein the final model indicates a percentage of lung fluid content in the lung of the patient.

12. A method for determining a lung fluid content in a lung of a patient, comprising:
    providing an ultrawideband pulse generator that generates one or more ultrawideband pulse and transmits the one or more ultrawideband pulse into a chest of the patient;
    positioning an ultrawideband RF sensor on the patient's chest adjacent to the patient's skin to receive reflected backscatter waves from the patient's chest;
    using a sparse deconvolution inversion algorithm to detect reflection points indicating tissue interfaces within the patient's body and creating a sparsity-based image;
    generating an initial model using one or more of Markov Chain Monte Carlo or Deep Neural Network estimates; and
    generating a final model using a neural renderer,
        previously providing the neural renderer with confirmed data that permits the neural renderer to predict a form of the sparse deconvolution reflection points given previously established model parameters,
        creating an image using the neural renderer, wherein the image is compared to the sparsity-based image, and
        creating refined images using the neural renderer in one or more of a predetermined number of iterations and based upon a predetermined threshold of a difference between the refined neural renderer image and the sparsity-based image.

13. A mobile bodily imaging system for determination of a lung fluid content in a lung of a patient, comprising:
- a stepped-frequency radar generator that generates one or more tone and transmits the one or more tone into a chest of the patient;
- an ultrawideband RF sensor positioned on the patient's chest adjacent to the patient's skin to receive reflected backscatter waves from the patient's chest;
- a sparse deconvolution inversion algorithm used to detect reflection points indicating tissue interfaces within the patient's body and create a sparsity-based image;
- an initial model generated using one or more of Markov Chain Monte Carlo or Deep Neural Network estimates; and
- a final model generated using a neural renderer,
  - wherein the neural renderer is previously provided with confirmed data that permits the neural renderer to predict a form of the sparse deconvolution reflection points given previously established model parameters,
  - wherein the neural renderer creates an image that is compared to the sparsity-based image, and
  - wherein the neural renderer creates refined images in one or more of a predetermined number of iterations and based upon a predetermined threshold of a difference between the refined neural renderer image and the sparsity-based image.

14. A method for determining a lung fluid content in a lung of a patient, comprising:
- providing a stepped-frequency radar generator that generates one or more tone and transmits the one or more tone into a chest of the patient;
- positioning an ultrawideband RF sensor on the patient's chest adjacent to the patient's skin to receive reflected backscatter waves from the patient's chest;
- using a sparse deconvolution inversion algorithm to detect reflection points indicating tissue interfaces within the patient's body and creating a sparsity-based image;
- generating an initial model using one or more of Markov Chain Monte Carlo or Deep Neural Network estimates; and
- generating a final model using a neural renderer,
  - previously providing the neural renderer with confirmed data that permits the neural renderer to predict a form of the sparse deconvolution reflection points given previously established model parameters,
  - creating an image using the neural renderer, wherein the image is compared to the sparsity-based image, and
  - creating refined images using the neural renderer in one or more of a predetermined number of iterations and based upon a predetermined threshold of a difference between the refined neural renderer image and the sparsity-based image.

* * * * *